United States Patent
Hole

(10) Patent No.: US 9,743,482 B2
(45) Date of Patent: Aug. 22, 2017

(54) COLOR CONTROL AND MIXING USING IMAGE PICKING

(71) Applicant: Jonathan Robert Hole, Cardiff (GB)

(72) Inventor: Jonathan Robert Hole, Cardiff (GB)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 15/061,600

(22) Filed: Mar. 4, 2016

(65) Prior Publication Data

US 2016/0262239 A1 Sep. 8, 2016

Related U.S. Application Data

(60) Provisional application No. 62/129,589, filed on Mar. 6, 2015.

(51) Int. Cl.
*H05B 33/08* (2006.01)
*H05B 37/02* (2006.01)
*G06F 3/0484* (2013.01)

(52) U.S. Cl.
CPC ..... *H05B 33/0863* (2013.01); *G06F 3/04847* (2013.01); *H05B 37/029* (2013.01)

(58) Field of Classification Search
None
See application file for complete search history.

(56) References Cited

U.S. PATENT DOCUMENTS

| 8,773,364 B2 | 7/2014 | Adenau et al. |
| 2009/0122086 A1 | 5/2009 | Diederiks et al. |
| 2010/0321306 A1 | 12/2010 | Adenau et al. |
| 2013/0162172 A1 | 6/2013 | Baaijens |
| 2013/0241437 A1 | 9/2013 | Baaijens |
| 2013/0271004 A1* | 10/2013 | Min ................... H05B 33/0842 315/112 |

FOREIGN PATENT DOCUMENTS

WO    WO 2011/073811    6/2011

OTHER PUBLICATIONS

European Search Report for Publication No. 16158978 mailed Jul. 16, 2016.

* cited by examiner

*Primary Examiner* — Dedei K Hammond
(74) *Attorney, Agent, or Firm* — King & Spalding LLP

(57) ABSTRACT

An image picker interface can include a display configured to show a first image, where the first image comprises a plurality of colors. The image picker interface can also include an image color control application communicably coupled to the display. The image color control application can detect at least one user selection on the display, where the at least one user selection on the display corresponds to at least one portion of the image. The image color control application can generate at least one generated selection on the display based on the at least one user selection, where the at least one generated selection corresponds to at least one additional portion of the image, where the at least one user selection and the at least one generated selection comprise a selection grouping. Each light fixture outputs a color that corresponds to a selection of the image.

19 Claims, 14 Drawing Sheets

COLOR CONTROL AND MIXING USING IMAGE PICKING

RELATED APPLICATIONS

The present application claims priority under 35 U.S.C. §119(e) to U.S. Provisional Patent Application No. 62/129,589, filed on Mar. 6, 2015, and titled "Color Control and Mixing Using Image Picking." The entire content of the foregoing application is hereby incorporated herein by reference.

TECHNICAL FIELD

Embodiments described herein relate generally to color control, and more particularly to systems, methods, and devices for color control and mixing using image pickers.

BACKGROUND

Generally speaking, color has three characteristics or aspects that contribute to what people see. These characteristics (also called color factors herein) are hue, saturation, and value. The hue of a color is the point along the human visual spectrum of colors, real or perceived, (e.g., red, orange, yellow, green, blue, violet, and magenta) that the color falls. The saturation (also called chroma) is the purity of the color. The value (also called brightness or luminosity) is the lightness or darkness of the color.

SUMMARY

In general, in one aspect, the disclosure relates to an image picker interface. The image picker interface can include a display configured to show a first image, where the first image includes a number of colors. The image picker interface can also include an image color control application communicably coupled to the display. The image color control application can detect at least one user selection on the display, where the at least one user selection on the display corresponds to at least one portion of the image. The image color control application can also generate at least one generated selection on the display based on the at least one user selection, where the at least one generated selection corresponds to at least one additional portion of the image, where the at least one user selection and the at least one generated selection make up a selection grouping. The image color control application can be configured to control a number of light fixtures, where each light fixture outputs, based on each selection of the selection grouping, an output color that matches an image color for each position and additional portion of the image.

In another aspect, the disclosure can generally relate to a system for selecting a color. The system can include a number of light fixtures, and a display presenting an image, where the image includes a number of colors. The system can also include an image picker interface communicably coupled to the light fixtures. The image picker interface can include a hardware processor, and a selection module executing instructions on the hardware processor, where the selection module receives at least one user selection on at least one location of the image. The image picker interface can also include a calculation module communicably coupled to the selection module, where the calculation module executes instructions on the hardware processor to generate at least one generated selection based on the at least one user selection, where the at least one generated selection corresponds to at least one additional location of the image, where the at least one user selection and the at least one generated selection make up a selection grouping. The image picker interface can further include a color control engine communicably coupled to the calculation module and the light fixtures. The color control engine can execute instructions on the hardware processor to determine a color of the image associated with each selection of the selection grouping, and to apply the color for each selection of the selection grouping to each light fixture.

In yet another aspect, the disclosure can generally relate to a computer readable medium comprising computer readable program code embodied therein for a method for assigning colors picked from an image to multiple devices. The method can include presenting an image on a display, and receiving a first user selection of a first portion of the image on the display from a user. The method can also include generating, based on the first user selection, at least one generated selection on at least one additional portion of the image on the display, where the first user selection and the at least one generated selection make up a selection grouping. The method can further include determining a color of the first portion and the at least one additional portions of the image that corresponds to each selection of the selection grouping. The method can also include assigning a number of light sources to the selection grouping. The method can further include applying the color of each selection of the selection grouping to the light sources, where each light source emits the corresponding color.

These and other aspects, objects, features, and embodiments will be apparent from the following description and the appended claims.

BRIEF DESCRIPTION OF THE DRAWINGS

The drawings illustrate only example embodiments of color control and mixing using image pickers and are therefore not to be considered limiting of its scope, as color control and mixing using image pickers may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION OF EXAMPLE EMBODIMENTS

Figure 1:
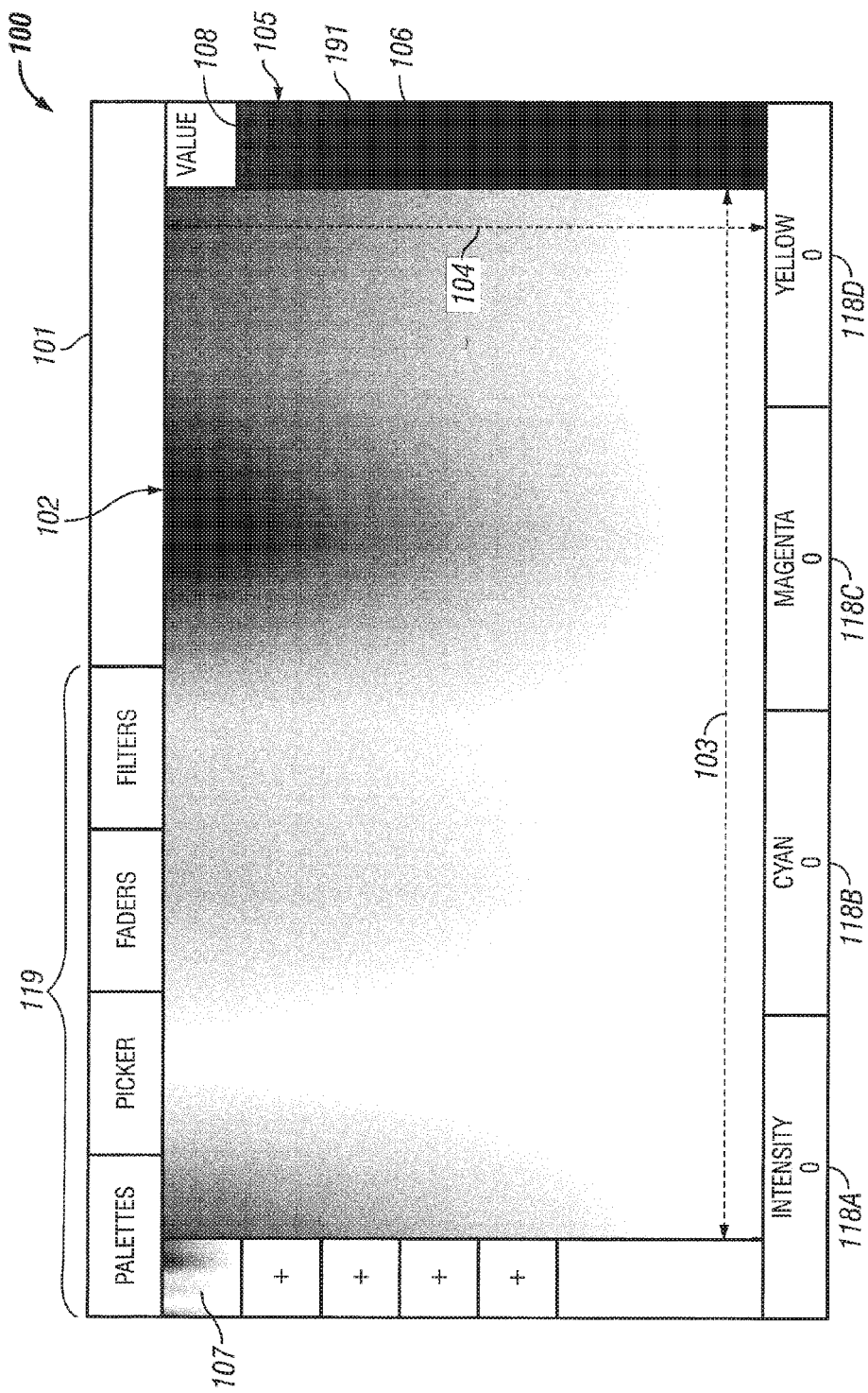
FIG. 1 shows a color picker interface currently used in the art.

The example embodiments discussed herein are directed to systems, apparatuses, and methods of color control and mixing using image pickers. While example embodiments described herein are directed to use with lighting systems, example embodiments can also be used in systems having other types of devices. Examples of such other systems can include, but are not limited to, computer displays, electronic signs, mobile devices (e.g., tablets, smartphones), and televisions. Thus, example embodiments are not limited to use with lighting systems.

As described herein, a user can be any person that interacts with example color control and mixing using image pickers. Examples of a user may include, but are not limited to, a consumer, an electrician, an engineer, a mechanic, a lighting engineer, a lighting technician, a lighting designer, a lighting programmer, an instrumentation and control technician, a consultant, a contractor, an operator, and a manufacturer's representative. For any figure shown and described herein, one or more of the components may be omitted, added, repeated, and/or substituted. Accordingly, embodiments shown in a particular figure should not be considered limited to the specific arrangements of components shown in such figure.

Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number, and corresponding components in other figures have the identical last two digits.

In certain example embodiments, the image pickers (or portions thereof) described herein meet one or more of a number of standards, codes, regulations, and/or other requirements established and maintained by one or more entities. Examples of such entities include, but are not limited to, the Professional Lighting and Sound Association (PLASA) and the United States Institute of Theater Technology (USITT).

Example embodiments of color control and mixing using image pickers will be described more fully hereinafter with reference to the accompanying drawings, in which example embodiments of color control and mixing using image pickers are shown. Color control and mixing using image pickers may, however, be embodied in many different forms and should not be construed as limited to the example embodiments set forth herein. Rather, these example embodiments are provided so that this disclosure will be thorough and complete, and will fully convey the scope of color control and mixing using image pickers to those of ordinary skill in the art. Like, but not necessarily the same, elements (also sometimes called components) in the various figures are denoted by like reference numerals for consistency.

Terms such as "top", "bottom", "left", "right", "first", and "second" are used merely to distinguish one component (or part of a component or state of a component) from another. Such terms are not meant to denote a preference or a particular orientation. Also, the names given to various components described herein are descriptive of one or more embodiments and are not meant to be limiting in any way. Those of ordinary skill in the art will appreciate that a feature and/or component shown and/or described in one embodiment (e.g., in a figure) herein can be used in another embodiment (e.g., in any other figure) herein, even if not expressly shown and/or described in such other embodiment.

FIG. 1 show a color picker interface 100 currently used in the art. The color picker interface 100 of FIG. 1 includes a two-dimensional display 101 with an image 102 that is a two-dimensional rainbow pattern (also called, among other names, a color spectrum or a color space). The image 102 in the display 101 has a variation in hue 103 along the horizontal axis and a variation in saturation 104 along the vertical axis. The color picker interface 100 can also include one or more thumbnail images 107 to one side (in this case, the left side) of the display 101. In this case, there is one thumbnail image 107 of the display 101. The color picker interface 100 can further include a slidebar 105 on another side (in this case, the right side) of the display 101. The slidebar 105 can include a selector 108 to select a value of color among a range 106 of values 191 (also called selections 191). A user selects a point on the display 101, and the color (combination of value (from the slidebar 105), hue 103, and saturation 104) that corresponds to that point is transferred to some output (e.g., one or more light fixtures).

While the color picker interface 100 offers a quick and intuitive way of accessing a color by a user, the color picker interface 100 currently used in the art leads to choosing a single color, which leads to a flat and uninteresting (e.g., monotonous) output. Therefore, one or more devices (e.g., lighting fixtures, displays) that receive the output of the color picker interface 100 have an output that is likewise flat and uninteresting.

In addition, the color picker interface 100 currently used in the art was not designed for choosing very specific colors with accuracy. For example, trying to accurately select a color of a corporate logo is difficult to accomplish using the color picker interface 100. Further, the color picker interface 100 currently used in the art only allows selection of a single color. In other words, multiple selections cannot be made at one time on the color picker interface 100 currently used in the art.

Additional examples of features of the color picker interface 100 of FIG. 1 are the tab selections 119 and the numeric indicators 118. The tab selections 119 allow a user to select from among a number of options (in this case, pallettes, picker, faders, and filters, where picker is selected) to help the user select an overall color. In certain example embodiments, a tab selection 119 can correspond to one or more light fixtures within a lighting system. In addition, or in the alternative, a tab selection 119 can correspond to one or more light sources within a light fixture.

If a tab selection 119 is not designated for selection of one or more light fixtures, then light fixtures can be selected in one or more of a number of other ways, including but not limited to default values, command code, and activation of a light fixture. The numeric indicators 118 assign a numeric value to something associated with a color component, for example a selection of the image 102. In this example, the numeric indicators show that the intensity is zero, the cyan is at a value of 1 (e.g., 1%, 1 in a range between zero and 255, as with DMX values), the magenta is at a value of 27, and the yellow is at a value of 91.

Figure 2:
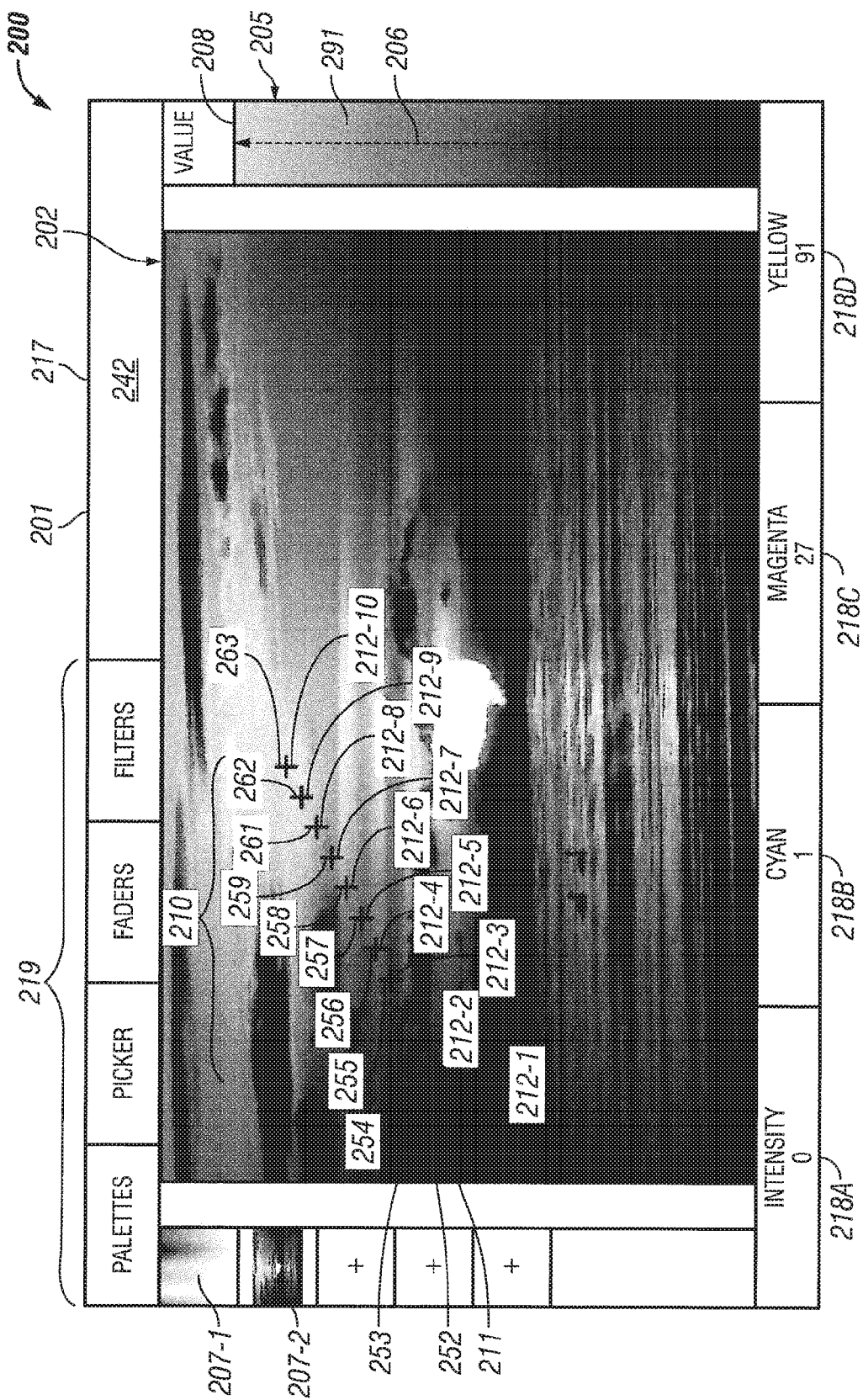
FIG. 2 shows an image picker interface in accordance with certain example embodiments.

By contrast, FIG. 2 shows an image picker interface 200 in accordance with certain example embodiments. Similar to the color picker interface 100 of FIG. 1, the image picker interface 200 of FIG. 2 includes a controller 205 (in this case, a slidebar) that allows for selection of one or more components of color (in this case, the value of the color). Specifically, in this example, the controller 205 (also called a user interface element 205 herein) can include a selector 208 to select a value of color among a range 206 of color values 291.

Also, similar to the color picker interface 100 of FIG. 1, the image picker interface 200 of FIG. 2 can include one or more thumbnail images to one side (in this case, the left side) of the image picker interface 200. In this case, the image picker interface 200 includes thumbnail image 207-1, which is substantially the same as thumbnail image 107 of FIG. 1, and thumbnail image 207-2, which represents the image 202 shown in the display 201. In certain example embodiments, when a thumbnail image of the image picker interface 200 is selected, that image appears in the display 201 of the image picker interface 200.

Unlike the image 102 in the display 101 of the color picker interface 100 of FIG. 1, the image 202 in the display 201 of the image picker interface 200 of FIG. 2 can show only a limited range of one or more components (e.g., hue, saturation) of color based on the image 202, as chosen, for example, from the list of thumbnail images shown in a portion of the image picker interface 200. Since the image 202 in the display 201 has a relatively limited range of color components, it can be easier for a user to select a desired color. Also, the arrangement of the image 202 can make it easier (e.g., more intuitive) for a desired color to be selected by a user. The image 202 and the thumbnail images can be loaded by a user, and so colors desired by a user can be more readily obtained based on those user-selected images. As defined herein, an image (e.g., image 202) used in example embodiments can be any type of image, including but not limited to a graphic, a photograph, a painting, a logo, a live feed, and a video.

In certain example embodiments, one or more user selections 211 are made on the image 202 showing on the display 201. For example, in this case, there is one user selection 211. Each user selection 211 can be discrete and designated on the display 201 in some fashion. In this case, the user selection 211 is disposed on the image 202 and shown as a "+". Each user selection 211 can be made by a user in any of a number of ways. For example, a user can physically contact the display 201 at a portion of the image 202 having a color 253 that the user would like a device (e.g., a light fixture) to emit. Each user selection 211 corresponds to a color (in this case, color 253) of the image 202 at the point where the user selection 211 is made.

Once all of the user selections 211 have been made, one or more generated selections 212 are generated on the image 202 by the image picker interface 200. The user selections 211 combined with the generated selections create a selection grouping 210. The generated selections 212 can be discrete and designated on the display 201 (or, more specifically, on the image 202) in some fashion. In this case, there are 10 generated selections 212 (generated selection 212-1, generated selection 212-2, generated selection 212-3, generated selection 212-4, generated selection 212-5, generated selection 212-6, generated selection 212-7, generated selection 212-8, generated selection 212-9, and generated selection 212-10) disposed on the image 202, where each generated selection 212 is designated by a "+". The depiction of a generated selection 212 on the image 202 can be the same as, or different than, the depiction of a user selection 211.

In addition, the generated selections 212 can be orientated in any of a number of ways with respect to each other. For example, as shown in FIG. 2, the generated selections 212 form a substantially straight line and are spaced substantially the same distance apart from each other. Aside from a straight line, the generated selections 212 can be oriented in any of a number of other shapes, including but not limited to an arc, a circle, a square, a triangle, a rectangle, a zig-zag, a sawtooth shape, and a random shape. Further, the spacing between adjacent generated selections 212 can vary rather than be equal.

In certain example embodiments, each generated selection 212 corresponds to a color of the image 202 where the generated selection 212 is located. For example, in this case, generated selection 212-1 corresponds to color 253 in the image 202, generated selection 212-2 corresponds to color 254 in the image 202, generated selection 212-3 corresponds to color 255 in the image 202, generated selection 212-4 corresponds to color 256 in the image 202, generated selection 212-5 corresponds to color 257 in the image 202, generated selection 212-6 corresponds to color 258 in the image 202, generated selection 212-7 corresponds to color 259 in the image 202, generated selection 212-8 corresponds to color 261 in the image 202, generated selection 212-9 corresponds to color 262 in the image 202, and generated selection 212-10 corresponds to color 263 in the image 202.

The characteristics (e.g., number of selections, shape, spacing between selections) of the selection grouping 210 can be chosen by a user. In addition, or in the alternative, the characteristics of the selection grouping 210 can be determined in one or more of a number of other ways, including but not limited to logic rules, default values, and characteristics of the image 202 in the display 201. In any case, when there are multiple selections in a selection grouping 210, the color parameters associated with those selections can be distributed among multiple devices and/or portions of a device. In this way, the devices and/or portions of one or more devices "fan" in a way that mimics the selection grouping 210. Examples of this are described below with respect to FIGS. 8-14.

The number and/or orientation of selections of the selection grouping 210 (the user selections 211 and the generated selections 212) can be based on one or more of a number of factors. For example, the number of selections in the selection grouping 210 can equal the number of devices (e.g., light fixtures) that are controlled by the image picker interface 200.

In some cases, rather than being driven by the devices, the number and/or orientation of the selection grouping 210 can each be selected by a user. As an alternative, the characteristics (e.g., orientation) of a limited number of selections of the selection grouping 210 can be made by a user, while the characteristics of a remainder of the selection grouping 210 can be generated automatically according to some algorithm or settings. For example, as shown in FIG. 2, a user can make one user selections 211 at one end of the selection grouping 210, and an algorithm can determine where the remaining selections (in this case, the generated selections 212) of the selection grouping 210 are disposed on the image 202.

Aside from a linear configuration, the algorithm can generate the selection grouping 210 (the user selections 211 and the generated selections 212) in any of a number of other shapes, such as those described above with respect to the generated selections. In some cases, such as described in the examples captured in FIGS. 8-14 below, the number and orientation of selections of the selection grouping 210 mirror the number and orientation of the devices that are controlled by the image picker interface 200.

In some cases, the user selections 211 are merely used to provide reference points for the placement of the generated selections 212, and so the color of the image 202 that corresponds to the user selections 211 is not used to control the devices. For example, to form a selection grouping 210 in the shape of a circle, a user can have a first user selection 211 that represents a center of the circle, followed by a second user selection that represents a radius of the circle. Subsequently, the generated selections 212 are generated in the form of a circle with the radius, based on the two user selections 211. Alternatively, if the radius and the number of selections in the selection grouping 210 are already known, a single user selection 311 representing the center of the circle can result in the placement of the selection grouping 210 on the image 202 at the radius around the user selection 211. As another example, to form a selection grouping 210 in the shape of an ellipse, a user can have two user selections 211 that represent the two focus points, and the generated selections 212 can form the ellipse around the two user selections 211.

Further, alterations to an existing selection grouping 210 can be made. For example, the shape of the selection grouping 210 can be altered, for example by a user dragging one or more selections (e.g., user selection 211) to a different location on the image 202. Alternatively, one or more particular selections in a selection grouping 210 can be relocated. As yet another alternative, an entire selection grouping 210 can be moved to a different location on the image 202 without altering the shape of the selection grouping 210.

As yet a further alternative, the orientation of the selection grouping 210 can be altered (e.g., the selection grouping 210 can be rotated). As yet another alternative, the assignment of the selections within the selection grouping 210 to light fixtures can be altered so that a selection assigned to one light fixture becomes assigned to a different light fixture. In any case, these changes to the selection grouping 210 can occur in one or more of a number of ways, including but not limited to user input, passage of time, logic rules, and/or any other suitable factor.

As an alternative to the two-dimensional image 202 of FIG. 2, the image 202 in the display 201 can be of a single dimension or have more than two dimensions, where each dimension represents a color parameter (also called a component of color). In addition to hue, saturation, and value, other color parameters can include, but are not limited to, red, green, blue, cyan, magenta, amber, indigo, UV, lime, yellow, and white. In addition, or in the alternative, other aspects of the image picker interface 200 can allow for multiple selections of one or more color parameters. For example, the controller 205 can allow for multiple selections of a color parameter using the selector 208.

When multiple selections of one or more color parameters are made, those selections can be distributed among a number of devices (or portions thereof) that have been selected to be controlled by the color picker interface 200. In addition, or in the alternative, the multiple selections of a selection grouping 210 can be distributed to a single device (or portion thereof) over a period of time, where the color of one selection is emitted by the light fixture for one period of time (e.g., 10 seconds), then the color of a subsequent selection in the selection grouping 210 is emitted by the light fixture for another period of time, and so on.

Figure 3:
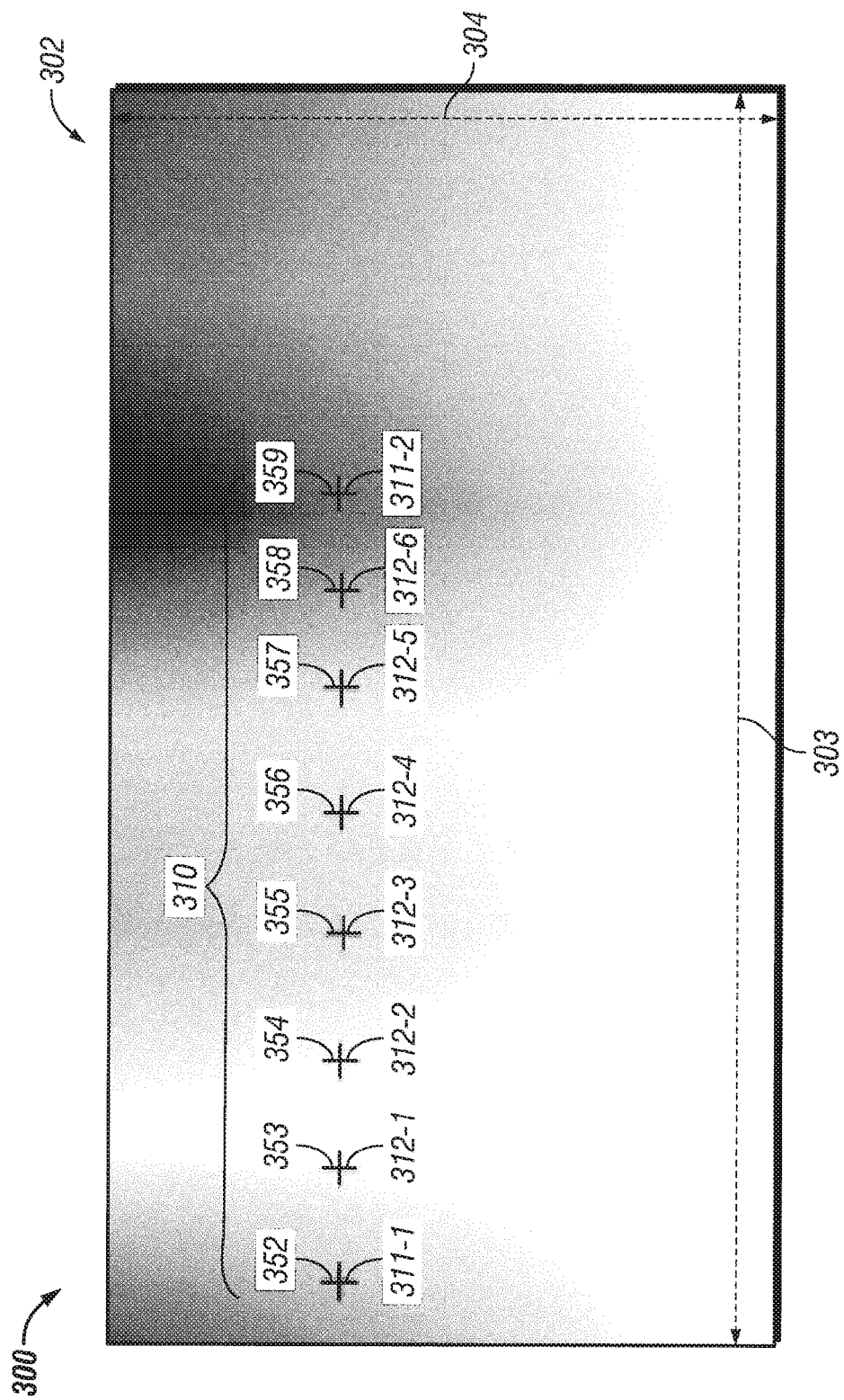
FIG. 3 shows an image that can be used with an image picker interface in accordance with certain example embodiments.

Example embodiments can be used with any type of image. For example, FIG. 3 shows another image 302 that is used with an image picker interface 300 in accordance with certain example embodiments. In this case, the image 302 is substantially the same as the image 102 of FIG. 1, except that the image 302 of FIG. 3 shows a selection grouping 310 that includes two user selections (user selection 311-1 and user selection 311-2), between which are disposed six generated selections 311. The selection grouping 310 is oriented in a horizontally linear fashion, where the selections of the selection grouping 310 are spaced substantially equidistantly from adjacent selections. In this case, the selection grouping 310 is spread along the hue 303 (horizontal axis), which means that the hue of each selection of the selection grouping 310 varies relative to the other selections in the selection grouping 310, while the saturation 304 (vertical axis) is substantially the same for all selections in the selection grouping 310.

As described above with respect to FIG. 2, each selection of the selection grouping 310 is associated with a color of the image where that respective selection is located. In this case, user selection 311-1 corresponds to color 352, generated selection 312-1 corresponds to color 353, generated selection 312-2 corresponds to color 354, generated selection 312-3 corresponds to color 355, generated selection 312-4 corresponds to color 356, generated selection 312-5 corresponds to color 357, generated selection 312-6 corresponds to color 358, and user selection 311-2 corresponds to color 359.

Figure 4A:
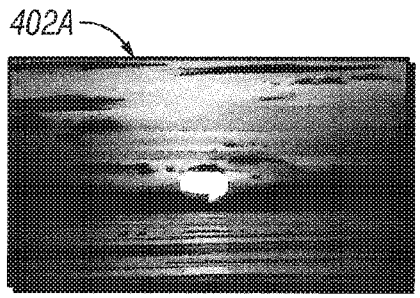
FIGS. 4A-4J show various examples of raw images and corresponding processed images that can be used with an image picker interface in accordance with certain example embodiments.
Figure 4B:
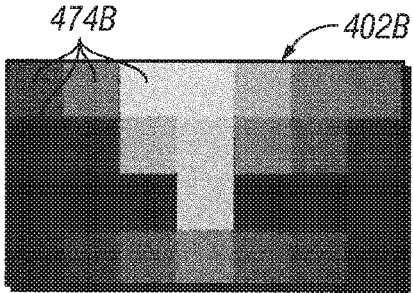
Figure 4C:
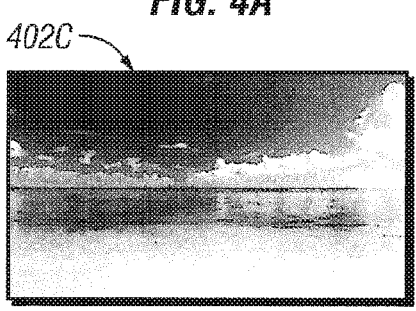
Figure 4D:
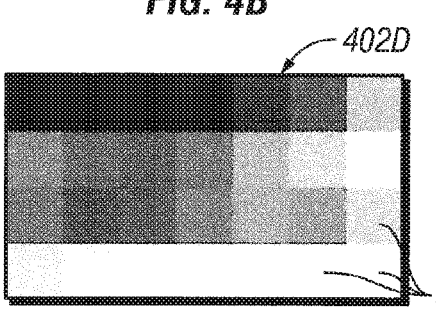
Figure 4E:
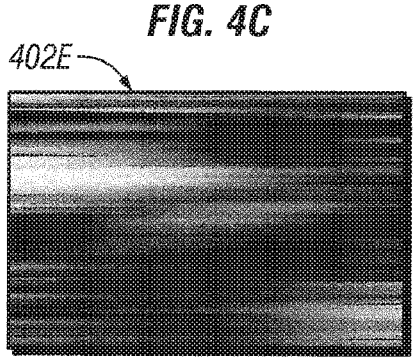
Figure 4F:
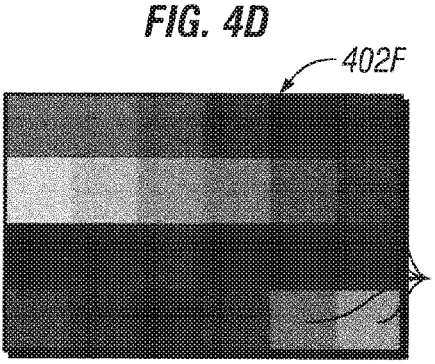
Figure 4G:
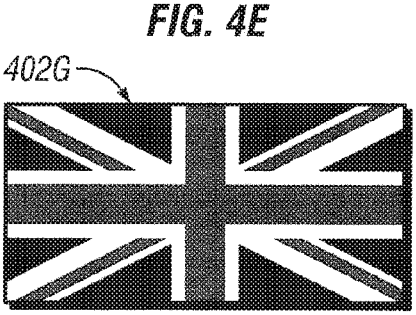
Figure 4H:
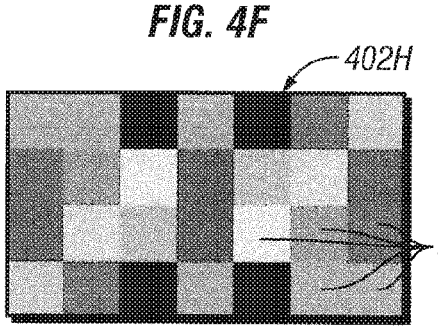
Figure 4I:
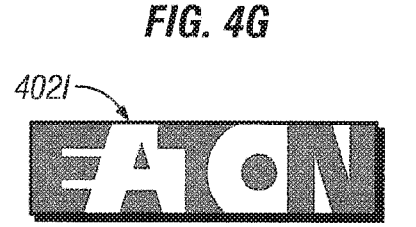
Figure 4J:
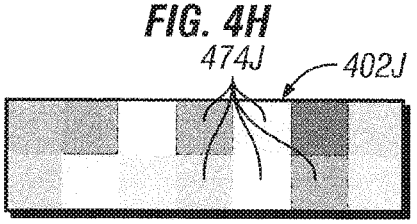

FIGS. 4A-4J show various examples of raw images and corresponding processed images that can be used with an image picker interface in accordance with certain example embodiments. Specifically, FIG. 4A shows a raw image 402A, and FIG. 4B shows a corresponding processed image 402B of the raw image 402A of FIG. 4A. FIG. 4C shows a raw image 402C, and FIG. 4D shows a corresponding processed image 402D of the raw image 402C of FIG. 4C. FIG. 4E shows a raw image 402E, and FIG. 4F shows a corresponding processed image 402F of the raw image 402E of FIG. 4E. FIG. 4G shows a raw image 402G, and FIG. 4H shows a corresponding processed image 402H of the raw image 402G of FIG. 4G. FIG. 4I shows a raw image 402I, and FIG. 4J shows a corresponding processed image 402J of the raw image 402I of FIG. 4I.

A processed image is the result of a raw image that has been manipulated in some way. The manipulation of the raw image can be based on input from a user, default parameters, one or more conditions, and/or any other suitable factor. In this case, each raw image is transformed into a corresponding processed image by dividing the raw image into any number of sectors and taking an average of the value of one or more color parameters within that sector. For example, in FIG. 4A, the image 402A is substantially the same as the image 202 of FIG. 2. The processed image 402B of FIG. 4B is divided into 28 total sectors 474B, configured in four rows of seven. The size of each the sector 474B in FIG. 4B is substantially the same as the size of the other sectors 474B. Further, each sector 474B represents the average value of the hue within the corresponding sector of the raw image 402A. The number of sectors, the arrangement of sectors, the shape of the sectors, the relative size of each sector, and any other variable associated with the sectors of an image can vary based on user input, logic rules, the type of image, the complexity of the image, and/or any other suitable factor.

In some example embodiments, logic rules can apply. For example, as shown in FIG. 4J, logic rules may dictate that the hue of one sector 474J must have at least some minimum difference in value relative to the hue of any adjacent sector 474J. Aside from averaging, the value of one or more color parameters in a sector 474 can be based on any of a number of methods, including but not limited to the most common value of a color parameter in the sector 474 of the raw image, the median value of a color parameter in the sector 474 of the raw image, and an average of the three most common values of a color parameter in the sector 474 of the raw image. The multiple selections, forming a selection grouping, can apply to a raw image or a processed image.

The raw images can take any form. For example, raw image 402A of FIG. 4A and raw image 402C of FIG. 4C are images of scenery. Raw image 402E of FIG. 4E is a random color array. Raw image 402G of FIG. 4G is an image of the flag of Great Britain. Raw image 402I of FIG. 4I is an image of a company logo. Therefore, whether a raw image is used or a process image is used, one or more desired colors (or components thereof) can be more easily selected by a user, and multiple selections of color parameters can be used for multiple devices and/or multiple portions of a single device.

Figure 5:
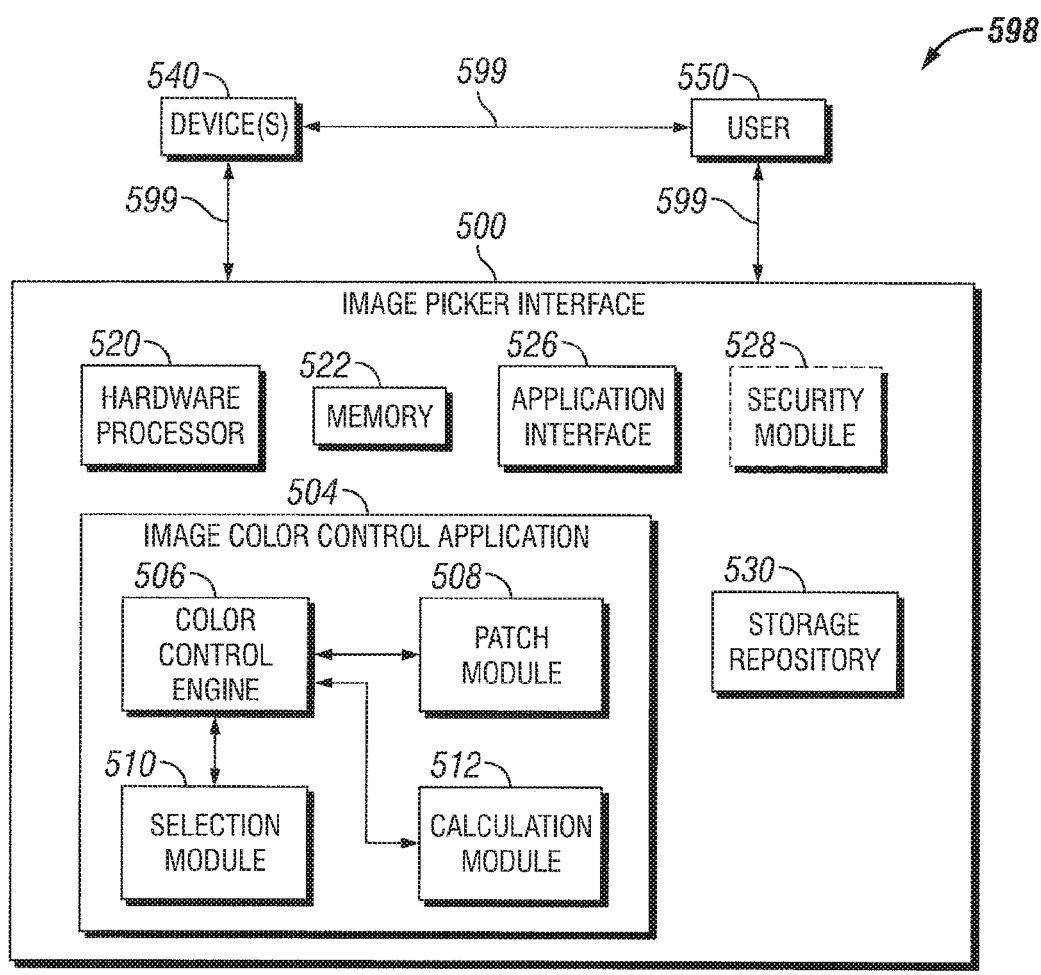
FIG. 5 shows a system diagram in accordance with certain example embodiments.

FIG. 5 shows a system diagram of system 598 in accordance with certain example embodiments. The system 598 can include the one or more devices 540, a user 550, and an image picker interface 500, which are coupled to each other using one or more communication links 599. The image picker interface 500 can include an image color control application 504, a storage repository 530, a hardware processor 520, a memory 522, an application interface 526, and, optionally, a security module 528. The image color control application 504 can include a color control engine 506, a patch module 508, a selection module 510, and a calculation module 512.

Each of these components is described in further detail below. Example embodiments are not limited to the configuration shown in FIG. 5 and discussed herein. Additionally, although certain components have been enumerated as being part of the system 598, it is understood that some components are combined with other components and/or some components are further divided into additional components in other alternative example embodiments.

Each communication link 599 can include wired (e.g., Class 1 electrical cables, Class 2 electrical cables, electrical connectors, power line carrier, RS485) and/or wireless (e.g., Wi-Fi, visible light communication, cellular networking, Bluetooth, WirelessHART, ISA100) technology. A communication link 599 can transmit signals (e.g., power signals, communication signals, control signals, data) between the image picker interface 500, the user 550, and/or the devices 540.

The user 550 is the same as a user defined above. The user 550 can use a user system (not shown), which may include a display 201 (e.g., a GUI). The user 550 interacts with the image picker interface 500 via the application interface 526 and one or more communication links 599. The device 540 can be one or more devices that use and/or project color. Examples of a device 540 can include, but are not limited to, a lighting fixture (or a portion thereof), a computer display, an electronic sign, and a television.

A device 540 can have multiple cells. A cell is a portion of the device 540 that acts independently of other cells of the device 540. In this way, a cell of a device 540 can be a type of sub-device. Alternatively, a cell of a device 540 can be considered its own device 540. For example, if the device 540 is a light fixture, a cell can be a light source of the light fixture. In such a case, the light fixture can have multiple cells (light sources). In addition, or in the alternative, when there are multiple devices 540 that are light fixtures, each light fixture can be a cell. Each device 540 can have information associated with it. Such information (also called device information) can include, but is not limited to, a model number, a number of light sources, a number of cells, a type of each light source, a location (e.g., mounted from the ceiling in a room), movement control capabilities, location(s) within a room or space to which light emitted from the device can be directed, color capabilities of each light source or cell, and age of each light source or cell.

The user 550 and/or the devices 540 can interact with the image picker interface 500 using an application interface 526 in accordance with one or more example embodiments. Specifically, the application interface 526 of the image picker interface 500 receives input data (e.g., information, communications) from and sends output data (e.g., information, communications) to the user 550 and/or each device 540. The user 550 and/or each device 540 can include an interface to receive data from and send data to the image picker interface 500 in certain example embodiments. Examples of this interface include, but are not limited to, a graphical user interface, an application programming interface, a keyboard, a monitor, a mouse, a touchscreen, a web service, a data protocol adapter, some other hardware and/or software, or any suitable combination thereof.

The storage repository 530 can be a persistent storage device (or set of devices) that stores software and data used to assist the color control engine 506 in communicating with the user 550 and the devices 540 within the system 598. In one or more example embodiments, the storage repository 530 stores the device information. Examples of a storage repository 530 include, but are not limited to, a database (or a number of databases), a file system, a hard drive, flash memory, some other form of solid state data storage, or any suitable combination thereof. The storage repository 530 is located on multiple physical machines, each storing all or a portion of the device information according to some example embodiments. Each storage unit or device can be physically located in the same or different geographic location.

The storage repository 530 can be operatively connected to the image color control application 504. In one or more example embodiments, the image color control application 504 includes functionality to communicate with the devices 540 and the user 550 in the system 598. More specifically, the image color control application 504 sends information to and/or receives information from the storage repository 530 in order to communicate with the devices 540 and/or the user 550.

The patch module 508 of the image color control application 504 retrieves and stores device information (defined above) stored in the storage repository 530. Further, the patch module 508 shares the device information with the color control engine 506. The patch module 508 can interface with the storage repository 530 based on instructions provided to the patch module 508 by the color control engine 506. For example, the patch module 508 can select multiple devices (e.g., multiple individual devices, portions (e.g., cells) of one or more devices) to be controlled by the image picker interface 500 and assign an order to the multiple devices.

The selection module 510 of the image color control application 504 can load a custom image (e.g., image 202, image 402G, image 402J) onto the display 201 and/or one or more thumbnail images (e.g., thumbnail image 207-2) into some other portion of the image picker interface 500. These images can be loaded into the image picker interface 500 based on a selection by a user 550, according to logic rules, by default, and/or based on some other suitable instruction. The selection module 510 can also determine and generate the location of one or more generated selections 211 based on one or more user selections 211 of the image that are made by the user 550. In certain example embodiments, the selection module does not generate any generated selections 212.

The calculation module 512 of the image color control application 504 can generate a selection grouping 210 based on the user selections 211 and the generated selections 212. The selection grouping 210 generated by the calculation module 512 has a number and shape that is based, at least in part, on the devices 540 (and associated device information) selected by the patch module 508. The shape of the selection grouping 210 and/or the spacing of the corresponding selections can be determined by a user 550 and/or by the calculation module 512. For example, the calculation module 512 may equate the number of selections in a selection grouping 210 to the number of devices 540 and/or the spacing of the devices 540. In such a case, the calculation module 512 can assign the devices 540 controlled by the image color picker 500 to the selections of the selection grouping 210, measure the distances between adjacent devices 540, determine the number of generated selections 212 needed to have the number of selections in the selection grouping 210 (including the user selections 211) match the number of devices 540, and locate the generated selections 212 on the image 202.

In certain example embodiments, the calculation module 512 can generate the selection grouping 210 based on a single user selection 211. For example, if the calculation module 512 generates a selection grouping 210 in the shape of a circle with a known radius, then the single user selection 211 can be the center of the selection grouping 210 generated by the calculation module 512.

In certain example embodiments, the color control engine 506 of the image color control application 504 identifies one or more user selections 211 made on the image 202 disposed on a display 201. The control engine 506 can also determines the color parameters of each selection of the selection grouping 210 and applies those color parameters to the device 540 assigned to that selection. In other words, the color control engine 506 sends power and/or control signals to the devices 540 so that the devices emit/have a color that matches the color parameters of the selection of the selection grouping 210 on the image 202 to which the device 540 is assigned. The color control engine 506 can also convert color parameters under certain operating conditions (e.g., dimming, subtractive color mixing) of the devices 540.

The characteristics (e.g., number of devices 540, number of cells in a device 540, configuration of cells in a device 540, location of devices 540, capabilities of a device 540 or a cell of a device 540) of a device 540 can be determined by the color control engine 506 based on the device information supplied by the patch module 508. The color control engine 506 can also receive instructions (e.g., repositioning of a selection in the selection grouping 210, receipt of a new user selection 211, selection of a new image 202, converting a raw image to a processed image), execute those instructions, adjust the color parameters associated with each selection in the selection grouping 210, and send new power and/or control signals to the devices 540 based on these adjusted color parameters.

The color control engine 506 can also define and/or generate colors based on the size of a selection of the selection grouping 210. In other words, the color control engine 506 can determine how many pixels are included in a selection and generate a color based on those pixels (for example, by using some type of averaging). The color control engine 506 can also control when and how a color is applied to a device so that certain effects (e.g., "moving" an image using the devices 540) can be achieved. While FIG. 5 shows that each module (in this case, the patch module 508, the selection module 510, and the calculation module 512) of the image color control application 504 only communicate with the color control engine 506, in certain embodiments, one module can communicate directly with one or more other modules of the image color control application 504.

The functions of the image color control application 504 can be performed on a single computing device or on multiple computing devices. When the functions of the image color control application 504 are performed on multiple computing devices, a number of configurations and/or frameworks are used in certain example embodiments. The configurations and/or software frameworks are designed to work with multiple data nodes and large quantities of data. One or more calculations performed by one or more components of the image color control application 504 are performed on multiple machines operating in parallel, where the results from each machine is combined to generate a result to the one or more calculations.

The hardware processor 520 of the image picker interface 500 executes software in accordance with one or more example embodiments. Specifically, the hardware processor 520 can execute software on the image picker interface 500 or any portion thereof, as well as software used by the user 550 and/or one or more devices 540. The hardware processor 520 can be an integrated circuit, a central processing unit, a multi-core processing chip, a multi-chip module including multiple multi-core processing chips, or other hardware processor in one or more example embodiments. The hardware processor 520 is known by other names, including but not limited to a computer processor, a microprocessor, and a multi-core processor.

In one or more example embodiments, the hardware processor 520 executes software instructions stored in memory 522. The memory 522 includes one or more cache memories, main memory, and/or any other suitable type of memory. The memory 522 is discretely located on the image picker interface 500 relative to the hardware processor 520 according to some example embodiments. In certain configurations, the memory 522 also is integrated with the hardware processor 520.

Optionally, in one or more example embodiments, the security module 528 secures interactions between the image picker interface 500, the user 550, and/or the devices 540. More specifically, the security module 528 authenticates communication from software based on security keys verifying the identity of the source of the communication. For example, user software may be associated with a security key enabling the software of the user 550 to interact with the image picker interface 500 and/or the devices 540. Further, the security module 528 restricts receipt of information, requests for information, and/or access to information in some example embodiments.

The user 550, the image picker interface 500, and devices 540 can use their own system or share a system in certain example embodiments. Such a system can be, or contain a form of, an Internet-based or an intranet-based computer system that is capable of communicating with various software. A computer system includes any type of computing device and/or communication device, including but not limited to the image picker interface 500. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 7.

Further, as discussed above, such a system can have corresponding software (e.g., user software, device software, computer system software). The software can execute on the same or a separate device (e.g., a server, mainframe, desktop personal computer (PC), laptop, personal desktop assistant (PDA), television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 598.

In certain example embodiments, the image picker interface 500 does not include a hardware processor 520. In such a case, the image picker interface 500 can include, as an example, an integrated circuit and/or one or more field programmable gate arrays (FPGA). Using FPGAs, integrated circuits, and/or other similar devices known in the art allows the image picker interface 500 to be programmable and function according to certain logic rules and thresholds without the use of a hardware processor. Alternatively, example image picker interfaces 500 can include a combination of a hardware processor 520 and non-hardware processor (e.g., FPGA, integrated circuits) devices.

Figure 6:
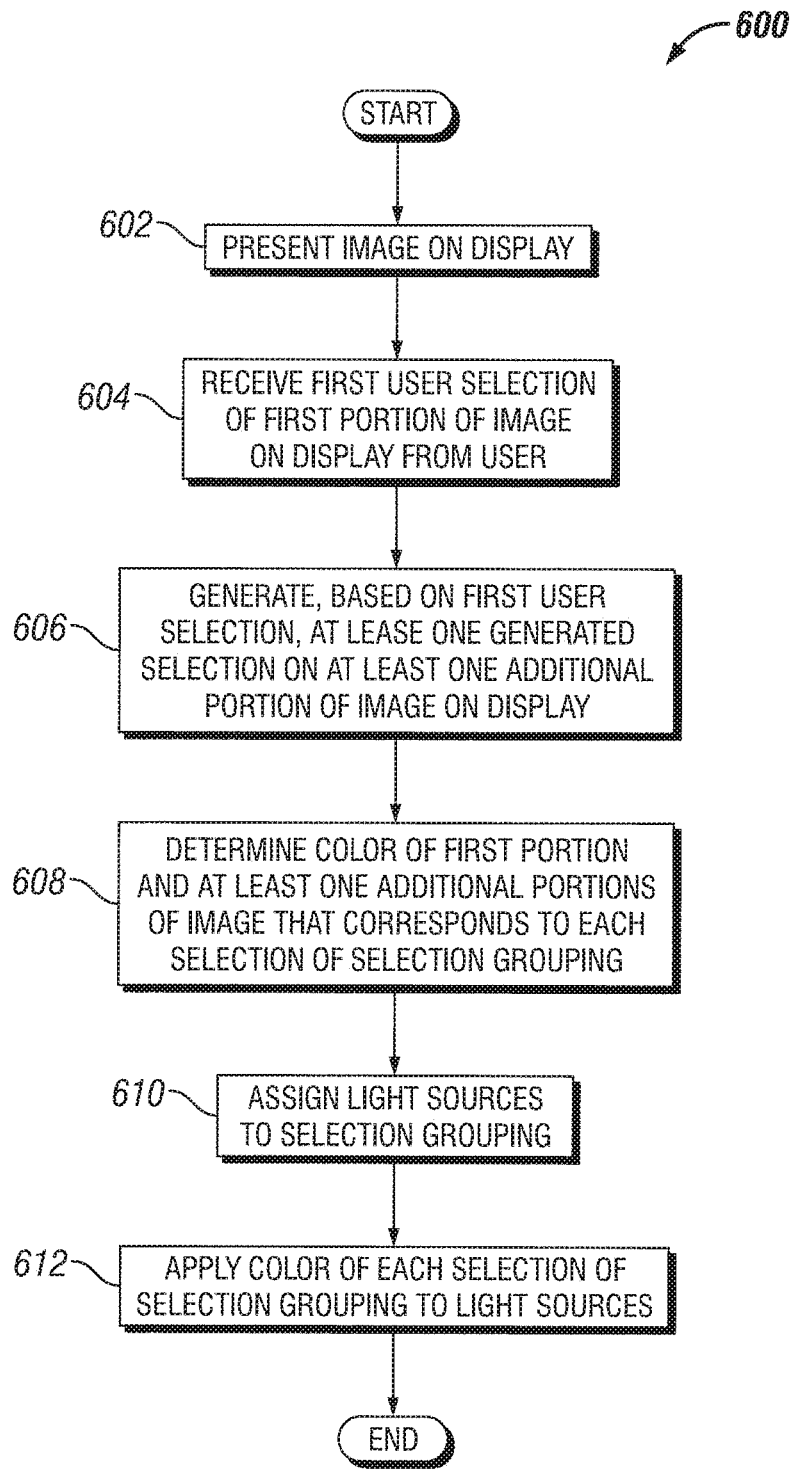
FIG. 6 shows a flowchart of a method for selecting color using image picking in accordance with certain example embodiments.

FIG. 6 shows a flowchart of a method 600 for assigning colors picked from an image to multiple devices in accordance with certain example embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the example embodiments, one or more of the steps described below may be omitted, repeated, and/or performed in a different order.

In addition, a person of ordinary skill in the art will appreciate that additional steps not shown in FIG. 6 may be included in performing this method 600. Accordingly, the specific arrangement of steps should not be construed as limiting the scope. Further, a particular computing device, as described, for example, in FIG. 7 below, can be used to perform one or more of the steps for the method 600 described below in certain exemplary embodiments.

Referring now to FIGS. 1-6, one or more devices 540 are selected in step 602 of the example method 600. The devices 540 can be selected using the patch module 508. The patch module 508 can be driven based on instructions from a user 550, default instructions, the occurrence of some event, the capabilities (e.g., light output) of a device 540, some other source, or any combination thereof. The patch module 508 can also select portions of a device 540. Alternatively, the devices 540 can be selected directly by a user 550.

In step 604, a user selection 211 made on an image 202 is received. The user selection 211 can be made by a user 550 physically selecting a location on the image 202, where that location on the image 202 has a color. In this way, the user selection 211 can be associated with that color of the image 202. The image 202 can be disposed on a display 201 of an image picker interface 200. The image 202 can be selected by a user 550 or by the color control engine 506. In certain example embodiments, there are at least two user selections 211 made on the image 202. The user 550 can make the user selections 211 using multiple touches on the image 202 disposed on the display 201 or by a single touch that includes sliding an object (e.g., finger, stylus) along the image 202 disposed on the display 201. In some cases, only a single user selection 211 is made by the user 550.

In step 606, at least one generated selection 212 is generated. In certain example embodiments, the generated selections 212 and the user selections 211 combine to make a selection grouping 210. The one or more generated selections 212 are created by the calculation module 512 based on the user selections 211 from step 604 and/or based on information provided by the color control engine 506. For example, the color control engine 506 can provide information regarding the devices 540, such as the number of devices 540, the distance between devices, and the shape formed by the devices 540. In some cases, the selection grouping 210 only includes user selections 211 and not any generated selections 212. In some other cases, the selection grouping 210 only includes generated selections 212 and not any user selections 211.

The calculation module 512 can translate the orientation of the generated selections 212, both with respect to each other and with respect to the user selections 211, based on the information provided by the color control module 506 regarding the devices 540. For example, the total number, placement, and spacing of the selections of the selection grouping 210 can be identically scaled relative to the number, placement and spacing of the devices 540 (e.g., light fixtures) controlled by the image picker interface (e.g., image picker interface 200, image picker interface 500).

In step 608, the color of each portion of the image 202 that corresponds to each selection of selection grouping 210 is determined. The color (including characteristics thereof) associated with each selection of the selection grouping 210 is determined by the color control engine 506. Specifically, the color control engine 506 correlates each selection of the selection grouping 210 with the color (e.g., color 252) of the image 202 where the selection is made. In certain example embodiments, the color associated with a selection of the selection grouping 210 is recalculated by the color control engine 506 based on a change to the image 202, a change in a selection, a change in a color parameter, and/or some other applicable factor.

In step 610, the devices 540 are assigned to the selection grouping 210. The assignment of the devices 540 to the selections of the selection grouping 210 can be performed by the color control module 506. The assignment of the devices 540 to the selection grouping 210 can occur in one or more of a number of ways. For example, one device 540 can be assigned to one selection of the selection grouping 210. As another example, one light source within a single device 540 can be assigned to one selection of the selection grouping 210.

In step 612, the color associated with each selection of the selection grouping 210 is applied to the applicable device 540. The color of each selection in the selection grouping 210 can be applied to the devices 540 by the color control module 506 by sending signals (e.g., power signals, control signals, communication signals). The color control engine 506 can control the devices 540 using communication links 599. If a color is recalculated (changes), the color control engine 506 can also apply the recalculated colors to the devices 540 on a real-time basis relative to when the colors are recalculated. After step 612 is complete, the process can proceed to the END step. Alternatively, the process can revert to one of the previous steps listed above, depending on the circumstances of the system.

Figure 7:
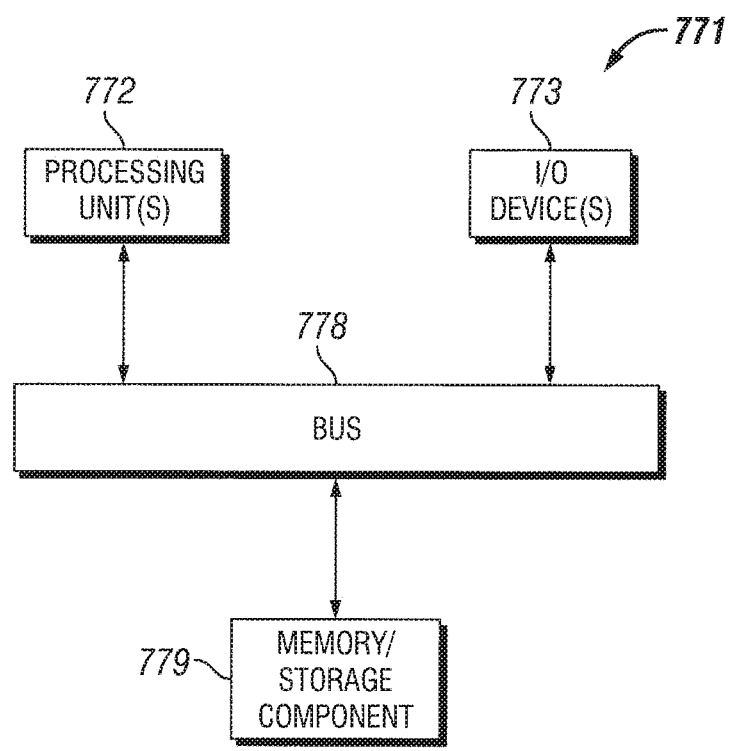
FIG. 7 shows a computing device in accordance with one or more example embodiments.

FIG. 7 illustrates one embodiment of a computing device 700 that implements one or more of the various techniques described herein, and which is representative, in whole or in part, of the elements described herein pursuant to certain exemplary embodiments. Computing device 700 is one example of a computing device and is not intended to suggest any limitation as to scope of use or functionality of the computing device and/or its possible architectures. Neither should computing device 700 be interpreted as having any dependency or requirement relating to any one or combination of components illustrated in the example computing device 700.

Computing device 700 includes one or more processors or processing units 702, one or more memory/storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 includes wired and/or wireless buses.

Memory/storage component 704 represents one or more computer storage media. Memory/storage component 704 includes volatile media (such as random access memory (RAM)) and/or nonvolatile media (such as read only memory (ROM), flash memory, optical disks, magnetic disks, and so forth). Memory/storage component 704 includes fixed media (e.g., RAM, ROM, a fixed hard drive, etc.) as well as removable media (e.g., a Flash memory drive, a removable hard drive, an optical disk, and so forth).

One or more I/O devices 706 allow a customer, utility, or other user to enter commands and information to computing device 700, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 700 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 600 includes at least the minimal processing, input, and/or output means necessary to practice one or more embodiments.

Further, those skilled in the art will appreciate that one or more elements of the aforementioned computer device 700 is located at a remote location and connected to the other elements over a network in certain exemplary embodiments. Further, one or more embodiments is implemented on a distributed system having one or more nodes, where each portion of the implementation (e.g., color control engine 506) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 8:
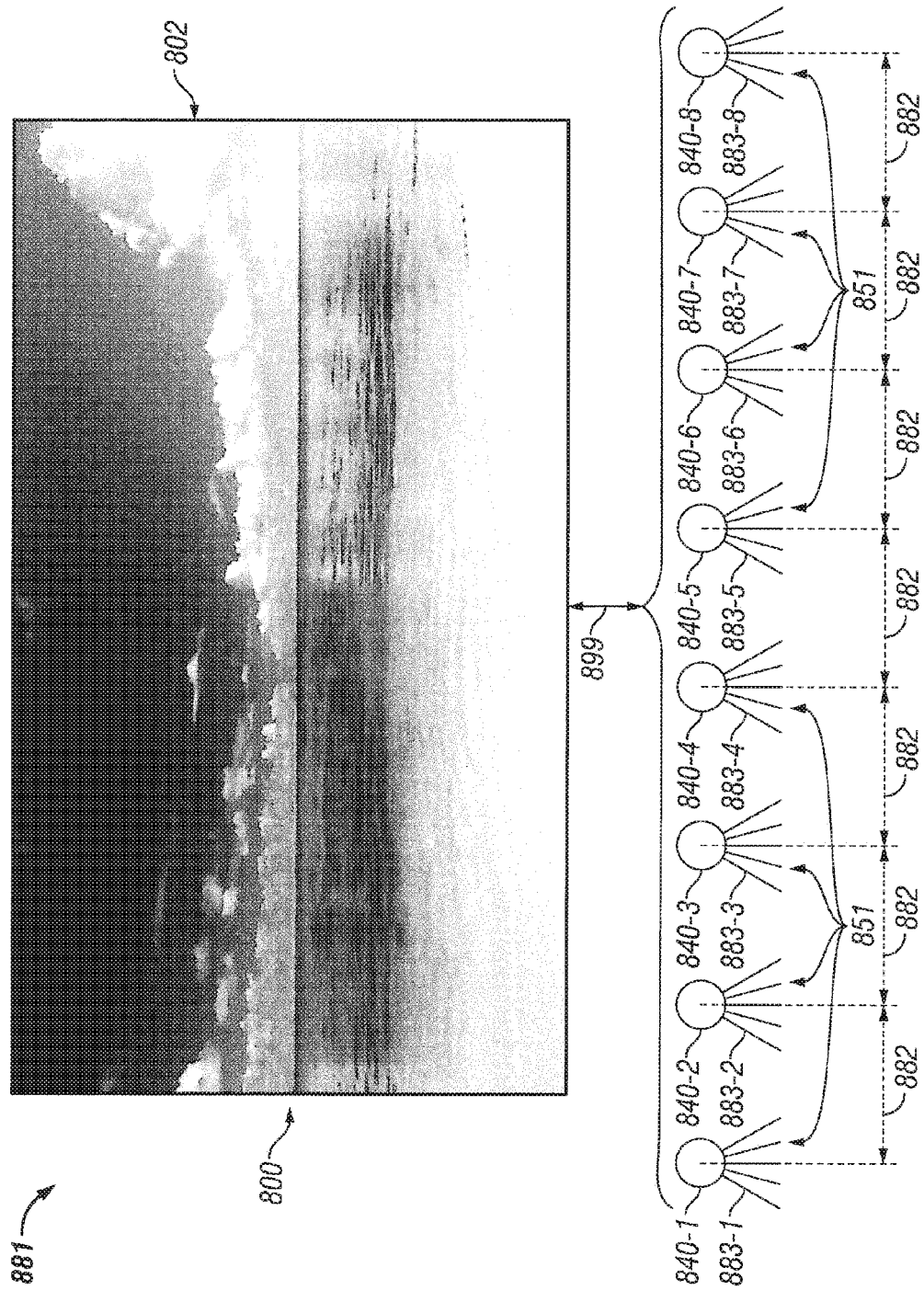
FIGS. 8-14 show examples of controlling light fixtures using example image picker interfaces.

FIGS. 8-14 show various examples of controlling light fixtures using example image picker interfaces. Referring to FIGS. 1-14, FIG. 8 shows a lighting system 881 that includes a color picker interface 800 and a number (in this case, eight) light fixtures 840 (a type of device 840). The eight light fixtures 840 are aligned in a straight line and are spaced substantially equidistantly from each other by a distance 882. The light fixtures 840 of FIG. 8 are light fixture 840-1, light fixture 840-2, light fixture 840-3, light fixture 840-4, light fixture 840-5, light fixture 840-6, light fixture 840-7, and light fixture 840-8.

Initially, as in FIG. 8, there are no user selections (e.g., user selection 211) or generated selections (e.g., generated selection 212) that have been made on the image 802, which is disposed on a display (hidden from view). As a result, each of the 8 light fixtures 840 emits light 883 (light 883-1 for light fixture 840-1, light 883-2 for light fixture 840-2, light 883-3 for light fixture 840-3, light 883-4 for light fixture 840-4, light 883-5 for light fixture 840-5, light 883-6 for light fixture 840-6, light 883-7 for light fixture 840-7, and light 883-8 for light fixture 840-8) of a default color 851. The image 802 can be selected using the selection module 510.

Figure 9:
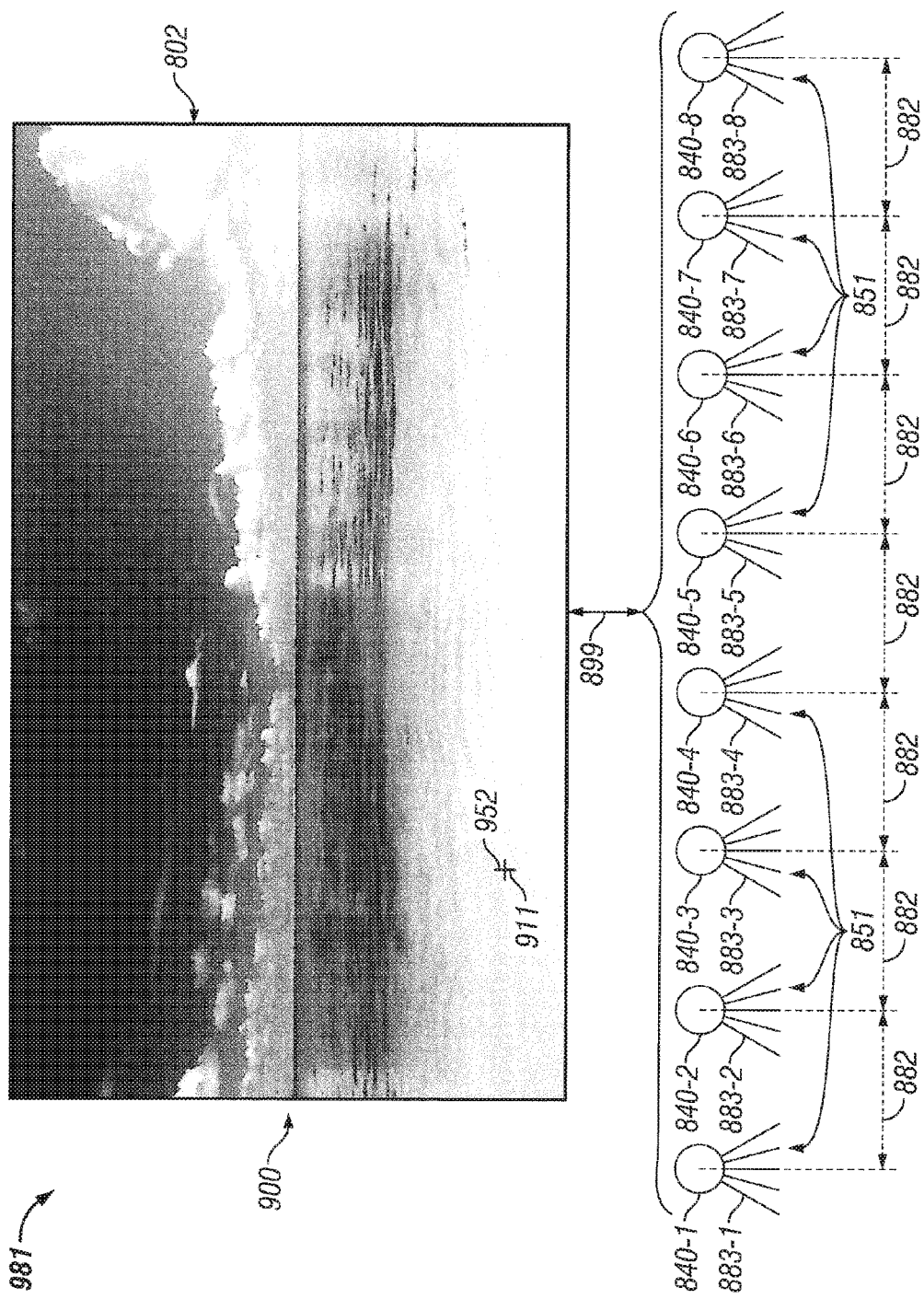

The system 981 of FIG. 9 changes from the system 881 of FIG. 8 in that a user selection 911 has been made on the image 802 of the color picker interface 900. The point on the image 802 where the user selection 911 is located has a color 952. Each of the 8 light fixtures 840 continue to emit light 883 in the default color 851. The user selection 911 can be received and processed by the color control engine 506.

Figure 10:
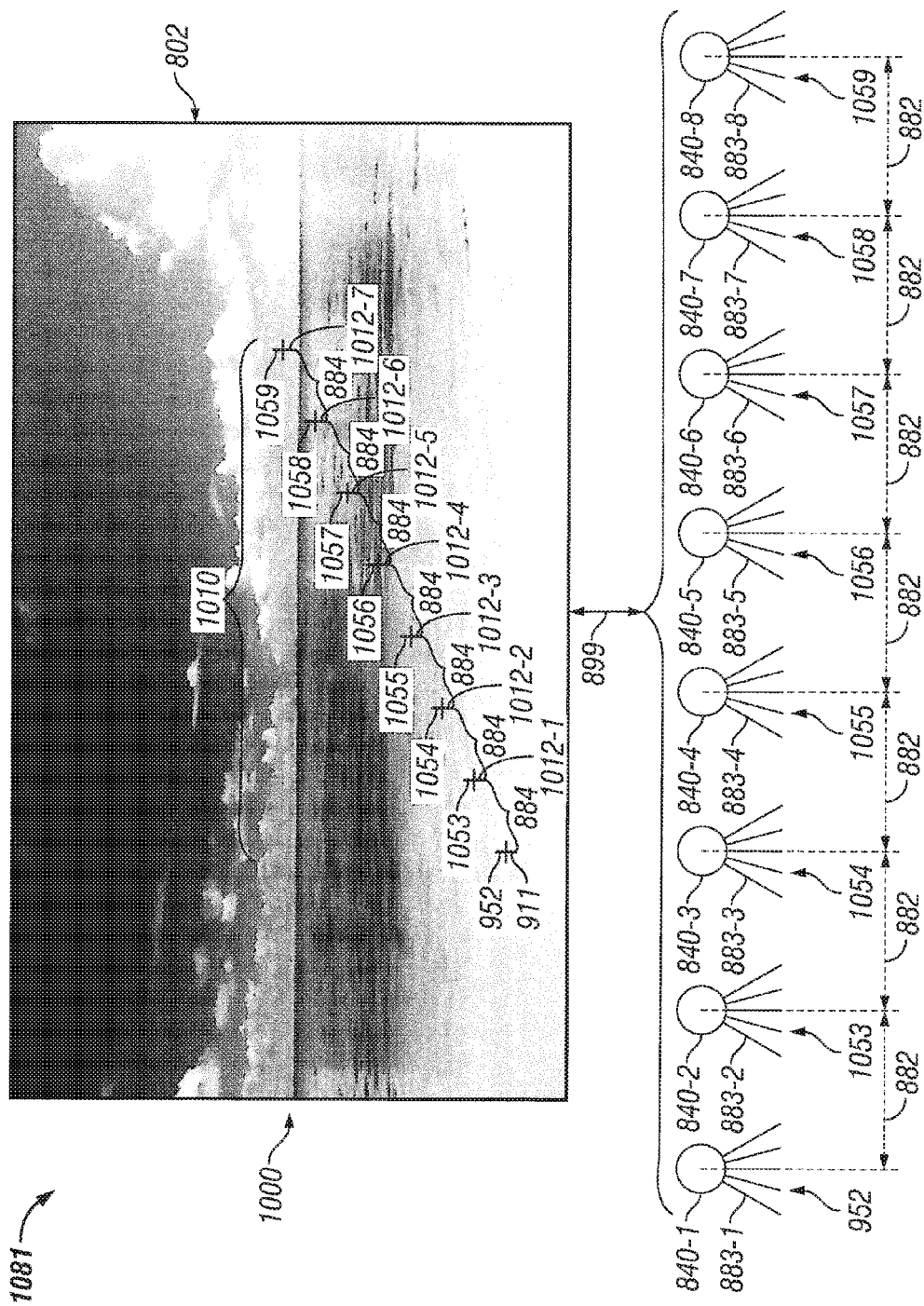

The system 1081 of FIG. 10 changes from the system 981 of FIG. 9 in that, in response to the user selection 911, a number (in this case, seven) of generated selections 1012 are placed on the image 802. Specifically, generated selection 1012-1 is placed adjacent to user selection 911. Generated selection 1012-2 is placed adjacent to generated selection 1012-1. Generated selection 1012-3 is placed adjacent to generated selection 1012-2. Generated selection 1012-4 is placed adjacent to generated selection 1012-3. Generated selection 1012-5 is placed adjacent to generated selection 1012-4. Generated selection 1012-6 is placed adjacent to generated selection 1012-5. Finally, generated selection 1012-7 is placed adjacent to generated selection 1012-6.

The generated selections 1012 can be generated, at least in part, by the calculation module 512. The number and positioning of the generated selections 1012 can be designed to correlate to the number and positioning of the light fixtures 840. As such, the generated selections 1012 are plotted on the image 802 in a straight line, just as the light fixtures 840 are installed in a straight line. Further, the generated selections 1012 are spaced substantially equidistantly from each other (and from user selection 911) by a distance 884.

For these purposes, the user selection 911 is the first selection of the selection grouping 1010. With the single user selection 911, the color picker interface 1000 (or portion thereof, such as the calculation module 512) has instructions to plot the generated selections 1012 on the image 802 at an angle (e.g., 30°) away from and to the right of the user selection 911. In this case, the calculation module 512 also has instructions to have the number of selections in the selection grouping 1010 equal the number of light fixtures 840, and to position the selections in the selection grouping 1010 to scale relative to the position of the light fixtures 840. Other instructions would require that the calculation module 512 generate a different number of generated selections 1012 and/or position the generated selections 1012 in a different way relative to each other and/or to the user selection 911.

In this case, the point on the image 802 where the generated selection 1012-1 is located has a color 1053. The point on the image 802 where the generated selection 1012-2 is located has a color 1054. The point on the image 802 where the generated selection 1012-3 is located has a color 1055. The point on the image 802 where the generated selection 1012-4 is located has a color 1056. The point on the image 802 where the generated selection 1012-5 is located has a color 1057. The point on the image 802 where the generated selection 1012-6 is located has a color 1058. Finally, the point on the image 802 where the generated selection 1012-7 is located has a color 1059.

Since the selection grouping 1010 is set on the image 802, the color picker interface 1000 (or portion thereof, such as the color control engine 506) can control the light fixtures 840 to emit light 883 of a color that corresponds to the colors of the selections of the selection grouping 1010 on the image 802. In this case, the color picker interface 1000, using the communication links 899, instructs light fixture 840-1 to emit light 883-1 of color 952, which correlates to (in this case, matches) the color 952 of the image 802 where user selection 911 is located. Similarly, the color picker interface 1000 [[1081]], using the communication links 899, instructs light fixture 840-2 to emit light 883-2 of color 1053, which matches the color 1053 of the image 802 where generated selection 1012-1 is located.

The color picker interface 1000, using the communication links 899, instructs light fixture 840-3 to emit light 883-3 of color 1054, which matches the color 1054 of the image 802 where generated selection 1012-2 is located. The color picker interface 1000, using the communication links 899, instructs light fixture 840-4 to emit light 883-4 of color 1055, which matches the color 1055 of the image 802 where generated selection 1012-3 is located. The color picker interface 1000, using the communication links 899, instructs light fixture 840-5 to emit light 883-5 of color 1056, which matches the color 1056 of the image 802 where generated selection 1012-4 is located.

The color picker interface 1000, using the communication links 899, instructs light fixture 840-6 to emit light 883-6 of color 1057, which matches the color 1057 of the image 802 where generated selection 1012-5 is located. The color picker interface 1000, using the communication links 899, instructs light fixture 840-7 to emit light 883-7 of color 1058, which matches the color 1058 of the image 802 where generated selection 1012-6 is located. Finally, the color picker interface 1000, using the communication links 899, instructs light fixture 840-8 to emit light 883-8 of color 1059, which matches the color 1059 of the image 802 where generated selection 1012-7 is located.

In this way, the light fixtures 840 emit light that mimic the color scheme of the image 802 across the selection grouping 1010. As discussed above, the orientation of the selection grouping 1010 can mirror the orientation of the light fixtures 840. For example, if the light fixtures 840 are arranged in an arc rather than a straight line, then the selection grouping 1010 can be arranged in an arc. The light fixtures 840 can be controlled all at once, in groups, at different times, or in any other fashion. Further, the light fixtures 840 can be controlled instantaneously (relative to when the selection grouping 1010 is established), after some time delay, or based on some other factor.

Figure 11:
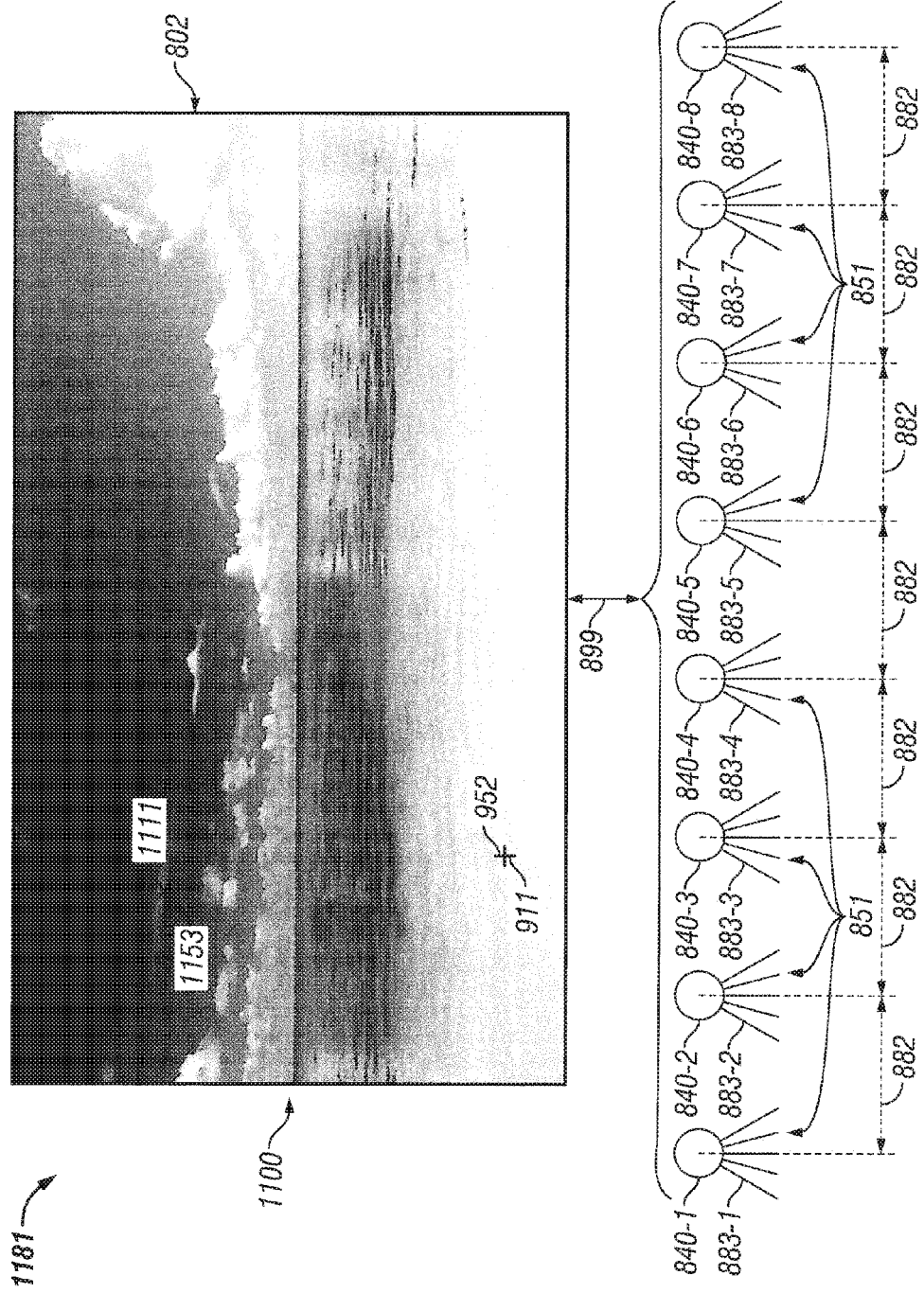
Figure 12:
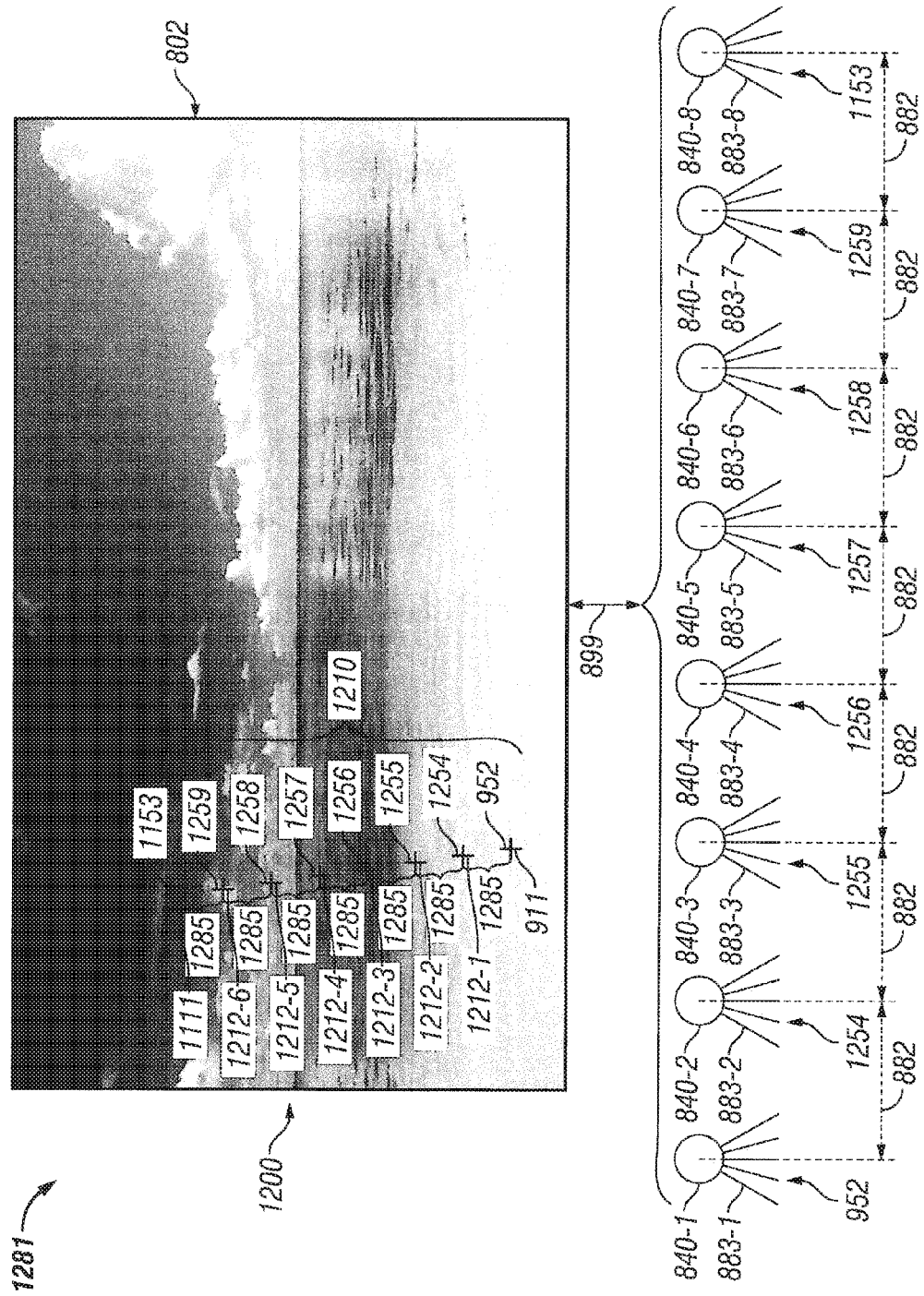

As another example, consider FIGS. 11 and 12 in conjunction with FIGS. 8 and 9 above. Specifically, from the user selection 911, corresponding to color 952 in the image 802, of FIG. 9, the system 1181 of FIG. 11 shows that a second user selection 1111 has been added to the image 802 of the color picker interface 1100 at a different location. In this case, user selection 1111 corresponds to color 1153 in the image 802. Each of the 8 light fixtures 840 continue to emit light 883 in the default color 851. The user selection 1111 can be received and processed by the color control engine 506.

The system 1281 of FIG. 12 changes from the system 1181 of FIG. 11 in that, in response to user selection 911 and user selection 1111, a number (in this case, six) of generated selections 1212 are placed on the image 802. Specifically, generated selection 1212-1, is placed adjacent to user selection 911. Generated selection 1212-2 is placed adjacent to generated selection 1212-1. Generated selection 1212-3 is placed adjacent to generated selection 1212-2. Generated selection 1212-4 is placed adjacent to generated selection 1212-3. Generated selection 1212-5 is placed adjacent to generated selection 1212-4. Finally, generated selection 1212-6 is placed between to generated selection 1212-5 and user selection 1111.

The generated selections 1212 can be generated, at least in part, by the calculation module 512. The number and positioning of the generated selections 1212 can be designed to correlate to the number and positioning of the light fixtures 840. As such, the generated selections 1212 are plotted on the image 802 in a straight line, using user selection 911 and user selection 1111 as the end points of the line, just as the light fixtures 840 are installed in a straight line. Further, the generated selections 1212 are spaced substantially equidistantly from each other (and from user selection 911 and user selection 1111) by a distance 1285.

For these purposes, the user selection 911 is the first selection of the selection grouping 1210, and user selection 1111 is the last selection of the selection grouping 1210. With the two user selections, the color picker interface 1200 (or portion thereof, such as the calculation module 512) has instructions to plot the generated selections 1212 on the image 802 user selection 911 and user selection 1111. In this case, the calculation module 512 also has instructions to have the number of selections in the selection grouping 1210 equal the number of light fixtures 840, and to position the selections in the selection grouping 1210 to scale relative to the position of the light fixtures 840.

In this case, the point on the image 802 where the generated selection 1212-1 is located has a color 1254. The point on the image 802 where the generated selection 1212-2 is located has a color 1255. The point on the image 802 where the generated selection 1212-3 is located has a color 1256. The point on the image 802 where the generated selection 1212-4 is located has a color 1257. The point on the image 802 where the generated selection 1212-5 is located has a color 1258. Finally, the point on the image 802 where the generated selection 1212-6 is located has a color 1259.

Since the selection grouping 1210 is set on the image 802, the color picker interface 1281 (or portion thereof, such as the color control engine 506) can control the light fixtures 840 to emit light 883 of a color that corresponds to the colors of the selections of the selection grouping 1210 on the image 802. In this case, the color picker interface 1281, using the communication links 899, instructs light fixture 840-1 to emit light 883-1 of color 952, which correlates to (in this case, matches) the color 952 of the image 802 where user selection 911 is located. Similarly, the color picker interface 1281, using the communication links 899, instructs light fixture 840-2 to emit light 883-2 of color 1254, which matches the color 1254 of the image 802 where generated selection 1212-1 is located.

The color picker interface 1281, using the communication links 899, instructs light fixture 840-3 to emit light 883-3 of color 1255, which matches the color 1255 of the image 802 where generated selection 1212-2 is located. The color picker interface 1281, using the communication links 899, instructs light fixture 840-4 to emit light 883-4 of color 1256, which matches the color 1256 of the image 802 where generated selection 1212-3 is located. The color picker interface 1281, using the communication links 899, instructs light fixture 840-5 to emit light 883-5 of color 1257, which matches the color 1257 of the image 802 where generated selection 1212-4 is located.

The color picker interface 1281, using the communication links 899, instructs light fixture 840-6 to emit light 883-6 of color 1258, which matches the color 1258 of the image 802 where generated selection 1212-5 is located. The color picker interface 1281, using the communication links 899, instructs light fixture 840-7 to emit light 883-7 of color 1259, which matches the color 1259 of the image 802 where generated selection 1212-6 is located. Finally, the color picker interface 1281, using the communication links 899, instructs light fixture 840-8 to emit light 883-8 of color 1153, which matches the color 1153 of the image 802 where user selection 1111 is located. Again, in this way, the light fixtures 840 emit light that mimic the color scheme of the image 802 across the selection grouping 1210.

Figure 13:
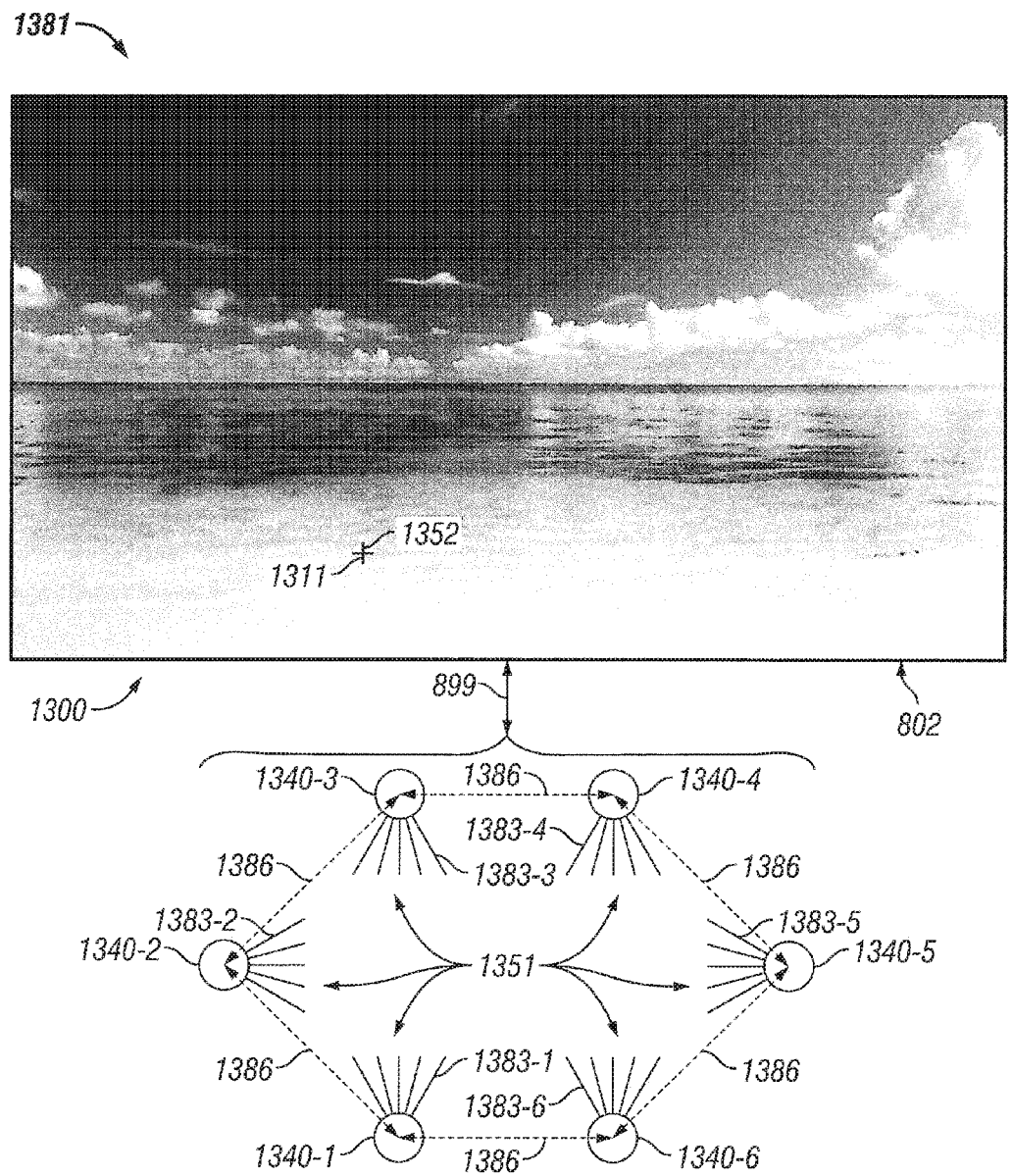
Figure 14:
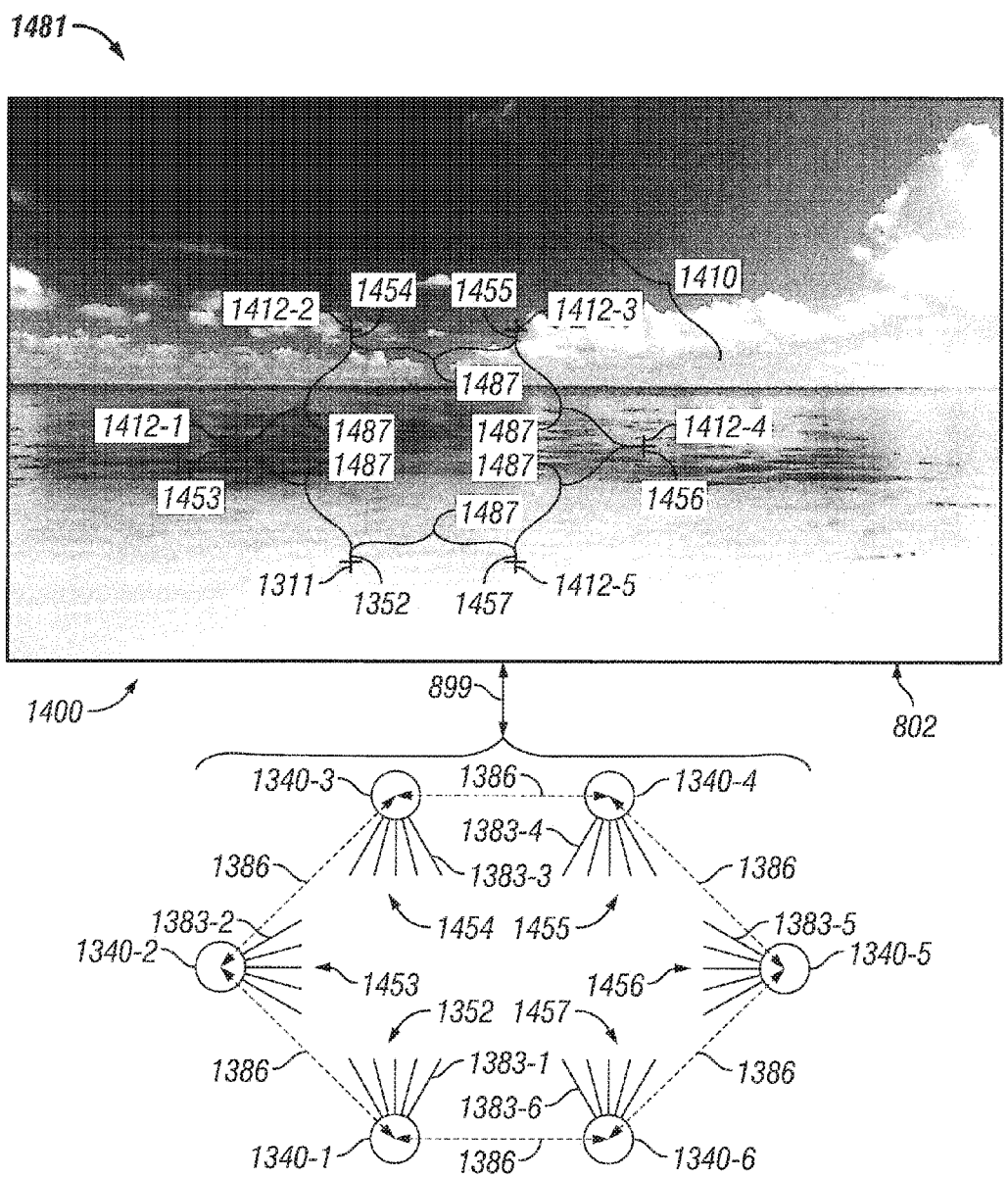

As another example, consider FIGS. 13 and 14. Specifically, the system 1381 of FIG. 13 includes a color picker interface 1300 that uses the same image 802 as in the previous examples. In this case, there are six light fixtures 1340 that are spread out equidistantly from each other in an oval shape, where each light fixture 1340 is separated from an adjacent light fixture 1340 by a distance 1386. The light fixtures 1340 of FIG. 8 are light fixture 1340-1, light fixture 1340-2, light fixture 1340-3, light fixture 1340-4, light fixture 1340-5, and light fixture 1340-6.

There is one user selection 1311 that appears on the image 802 disposed on the display of the color picker interface 1300. The point on the image 802 where the user selection 1311 is located has a color 1352. The user selection 1311 can be received and processed by the color control engine 506. Since no selection grouping has been formed by the color picker interface 1300 in FIG. 13, each of the six light fixtures 1340 emits light 1383 (light 1383-1 for light fixture 1340-1, light 1383-2 for light fixture 1340-2, light 1383-3 for light fixture 1340-3, light 1383-4 for light fixture 1340-4, light 1383-5 for light fixture 1340-5, and light 1383-6 for light fixture 1340-6. The image 802 can be selected using the selection module 510.

The system 1481 of FIG. 14 changes from the system 1381 of FIG. 13 in that, in response to the user selection 1311, a number (in this case, five) of generated selections 1412 are placed on the image 802. Specifically, generated selection 1412-1 is placed adjacent to user selection 1311. Generated selection 1412-2 is placed adjacent to generated selection 1412-1. Generated selection 1412-3 is placed adjacent to generated selection 1412-2. Generated selection 1412-4 is placed adjacent to generated selection 1412-3. Finally, generated selection 1412-5 is placed between and adjacent to generated selection 1212-4 and user selection 1311.

The generated selections 1412 can be generated, at least in part, by the calculation module 512. The number and positioning of the generated selections 1412 can be designed to correlate to the number and positioning of the light fixtures 840. As such, the generated selections 1412 are plotted on the image 802 in an oval/circular pattern, just as the light fixtures 840 are installed in an oval/circular pattern. Further, the generated selections 1412 are spaced substantially equidistantly from each other (and from user selection 1311) by a distance 1487.

For these purposes, the user selection 1311 is the first selection of the selection grouping 1410. With the single user selection 1311, the color picker interface 1400 (or portion thereof, such as the calculation module 512) of the system 1481 of FIG. 14 has instructions to plot the generated selections 1412 on the image 802 so that the generated selections 1412 are spaced as close to the center of the image 802 as possible. In this way, user selection 1311 is paired with light fixture 1340-1. In this case, the calculation module 512 also has instructions to have the number of selections in the selection grouping 1410 equal the number of light fixtures 1340, and to position the selections in the selection grouping 1410 to scale relative to the position of the light fixtures 1340.

In this case, the point on the image 802 where the generated selection 1412-1 is located has a color 1453. The point on the image 802 where the generated selection 1412-2 is located has a color 1454. The point on the image 802 where the generated selection 1412-3 is located has a color 1455. The point on the image 802 where the generated selection 1412-4 is located has a color 1456. Finally, the point on the image 802 where the generated selection 1412-5 is located has a color 1457.

Since the selection grouping 1410 is set on the image 802, the color picker interface 1400 (or portion thereof, such as the color control engine 506) can control the light fixtures 1340 to emit light 1383 of a color that corresponds to the colors of the selections of the selection grouping 1410 on the image 802. In this case, the color picker interface 1400, using the communication links 899, instructs light fixture 1340-1 to emit light 1383-1 of color 1352, which correlates to (in this case, matches) the color 1352 of the image 802 where user selection 1311 is located. Similarly, the color picker interface 1400, using the communication links 899, instructs light fixture 1340-2 to emit light 1383-2 of color 1453, which matches the color 1453 of the image 802 where generated selection 1412-1 is located.

The color picker interface 1400, using the communication links 899, instructs light fixture 1340-3 to emit light 1383-3 of color 1454, which matches the color 1454 of the image 802 where generated selection 1412-2 is located. The color picker interface 1400, using the communication links 899, instructs light fixture 1340-4 to emit light 1383-4 of color 1455, which matches the color 1455 of the image 802 where generated selection 1412-3 is located. The color picker interface 1400, using the communication links 899, instructs light fixture 1340-5 to emit light 1383-5 of color 1456, which matches the color 1456 of the image 802 where generated selection 1412-4 is located. Finally, the color picker interface 1400, using the communication links 899, instructs light fixture 1340-6 to emit light 1383-6 of color 1457, which matches the color 1457 of the image 802 where generated selection 1412-5 is located. Example embodiments provide a number of benefits. Examples of such benefits include, but are not limited to, more intuitive and real-time application of colors to multiple devices (or multiple cells within a device). To accomplish this, a user-selected image can be used to provide a range of color selections, and colors (or at least components of colors) can be selected by a user when the user "picks" points on the image. The resulting selection grouping can have a number of selections whose colors are delivered to devices assigned to those selections.

Example embodiments can also quickly calculate a change in a color component (e.g., new selection position, change in shape of a selection grouping) and apply the new color to a device. As a result, example embodiments allow for a more vibrant and dynamic color design that is applied to one or more devices. In addition, example embodiments allow for multiple proper and/or desired colors to be established more quickly and without the need for trial and error, as in the current art. For example, making multiple selections on the image of a corporate logo ensures that the proper colors are applied to the appropriate devices.

Example embodiments can include an image picker interface that further includes at least one thumbnail image disposed on the display, where the at least one thumbnail image comprises a smaller version of the image. Example embodiments can also include an image picker interface where the color that corresponds to each selection of the selection grouping comprises at least one color parameter. Example embodiments can further include an image picker interface where the selection grouping is a first number of selections, where the plurality of light fixtures is a second number of light fixtures, and where the first number equals the second number. Example embodiments can also include an image picker interface where the selection grouping has an order that matches the order of the plurality of light fixtures.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An image picker interface comprising:
   a display configured to show a first image, wherein the first image comprises a plurality of colors; and
   an image color control application communicably coupled to the display, wherein the image color control application:
     detects a first user selection at a first location on the display, wherein the first user selection at the first location on the display corresponds to a first color of the image at the first location; and
     generates one or more generated selections at one or more second locations on the display, wherein the one or more generated selections are based on the first user selection, wherein the one or more second locations on the display correspond to one or more second colors of the image at the one or more second locations, wherein the first user selection and the one or more generated selections comprise a selection grouping,
   wherein the image color control application is configured to control a plurality of light fixtures, wherein the image color control application assigns the first color to a first light fixture of the plurality of light fixtures, wherein the image color control application assigns the one or more second colors to a remainder of the plurality of light fixtures, wherein the first light fixture outputs the first color, and wherein each of the remainder of the plurality of light fixtures outputs one of the one or more second colors.

2. The image picker interface of claim 1, further comprising:
   at least one thumbnail image disposed on the display, wherein the at least one thumbnail image comprises a smaller version of the image.

3. The image picker interface of claim 1, further comprising:
   at least one controller disposed on the display, wherein the at least one controller comprises a range of color parameter selections, wherein each color parameter selection of the range of color parameter selections alters a color parameter of the first color and the one or more second colors.

4. The image picker interface of claim 1, wherein the first color and the one or more second colors comprise at least one color parameter.

5. The image picker interface of claim 1, wherein the image color control application generates the one or more generated selections based on a shape of the selection grouping, a size of the selection grouping, and a number of selections in the selection grouping.

6. The image picker interface of claim 5, wherein the shape of the selection grouping, the size of the selection grouping, and the number of selections in the selection grouping are selected by a user.

7. The image picker interface of claim 1, wherein the image color control application further detects a second user selection of the image at a third location on the display.

8. The image picker interface of claim 7, wherein the image color control application generates the one or more generated selections based on the first user selection and the second user selection.

9. The image picker interface of claim 8, wherein the selection grouping is generated based on a shape and a number of selections in the selection grouping.

10. The image picker interface of claim 1, wherein the selection grouping is a first number of selections, wherein the plurality of light fixtures is a second number of light fixtures, and wherein the first number equals the second number.

11. The image picker interface of claim 1, wherein the selection grouping has an order that matches the order of the plurality of light fixtures.

12. A system for selecting a color, the system comprising:
a plurality of light fixtures;
a display presenting an image, wherein the image comprises a plurality of colors;
an image picker interface communicably coupled to the plurality of light fixtures, wherein the image picker interface comprises:
a hardware processor;
a selection module executing instructions on the hardware processor, wherein the selection module receives a first user selection at a first location on the display, wherein the first user selection at the first location on the display corresponds to a first color of the image at the first location;
a calculation module communicably coupled to the selection module, wherein the calculation module executes instructions on the hardware processor to generate one or more generated selections at one or more second locations on the display, wherein the one or more generated selections are based on the first user selection, wherein the one or more generated selections at the one or more second locations on the display correspond to one or more second colors of the image at the one or more second locations, wherein the first user selection and the one or more generated selections comprise a selection grouping; and
a color control engine communicably coupled to the calculation module and the plurality of light fixtures, wherein the color control engine executes instructions on the hardware processor to:
determine the first color and the one or more second colors of the image associated with each selection of the selection grouping; and
apply the first color to a first light fixture of the plurality of light fixtures and the one or more second colors to a remainder of the plurality of light fixtures,
wherein the first light fixture outputs the first color, and wherein each of the remainder of the plurality of light fixtures outputs one of the one or more second colors.

13. The system of claim 12, further comprising:
a patch module communicably coupled to the calculation module, wherein the patch module executes instructions on the hardware processor to provide light fixture information for the plurality of light fixtures to the calculation module.

14. The system of claim 12, wherein the plurality of light fixtures comprises a plurality of light sources of a light fixture.

15. A computer readable medium comprising computer readable program code embodied therein for a method for applying colors picked from an image to a plurality of light sources, the method comprising:
presenting an image on a display;
receiving a first user selection of a first portion of the image on the display from a user;
generating, based on the first user selection, at least one generated selection on at least one additional portion of the image on the display, wherein the first user selection and the at least one generated selection comprise a selection grouping;
determining a color of the first portion and the at least one additional portion of the image that corresponds to each selection of the selection grouping;
assigning the plurality of light sources to the selection grouping; and
applying the color of each selection of the selection grouping to the plurality of light sources, wherein each light source of the plurality of light sources emits the corresponding color.

16. The computer readable medium of claim 15, further comprising:
selecting, prior to receiving the first selection, the plurality of light sources.

17. The computer readable medium of claim 15, further comprising:
receiving a second user selection of a second portion of the image on the display, wherein the at least one generated selection is further based on the second user selection, wherein the at least one generated selection is disposed between the first user selection and the second user selection, and wherein the selection grouping further comprises the second user selection.

18. The computer readable medium of claim 15, further comprising:
receiving, after applying the color of each selection of the selection grouping to each light source of the plurality of light sources, a revised first user selection;
regenerating, based on the change to the first user selection, at least one revised generated selection on at least one alternative portion of the image on the display, wherein the at least one revised generated selection and the revised first user selection comprise a revised selection grouping, wherein each revised selection of the revised selection grouping comprises a revised color; and
applying the revised color of each revised selection of the revised selection grouping to the plurality of light sources.

19. The computer readable medium of claim 15, further comprising:
revising the image to generate a processed image;
determining a plurality of revised colors based on the processed image; and
applying the revised colors to the plurality of light sources, wherein each light source of the plurality of light sources emits the corresponding revised color.

* * * * *